(12) United States Patent
Grossmann et al.

(10) Patent No.: US 9,159,135 B2
(45) Date of Patent: Oct. 13, 2015

(54) SYSTEMS, METHODS, AND COMPUTER PROGRAM PRODUCTS FOR LOW-LATENCY WARPING OF A DEPTH MAP

(71) Applicant: Intel Corporation, Santa Clara, CA (US)

(72) Inventors: Etienne G. Grossmann, Redwood City, CA (US); John I. Woodfill, Palo Alto, CA (US); Gaile Gordon, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 13/995,736

(22) PCT Filed: Mar. 15, 2013

(86) PCT No.: PCT/US2013/031967
§ 371 (c)(1),
(2) Date: Jun. 19, 2013

(87) PCT Pub. No.: WO2013/148308
PCT Pub. Date: Oct. 3, 2013

(65) Prior Publication Data
US 2014/0064607 A1   Mar. 6, 2014

Related U.S. Application Data

(60) Provisional application No. 61/616,507, filed on Mar. 28, 2012.

(51) Int. Cl.
*G06K 9/00* (2006.01)
*G06T 7/00* (2006.01)
*G06T 3/00* (2006.01)

(52) U.S. Cl.
CPC ............. *G06T 7/0051* (2013.01); *G06T 3/0093* (2013.01)

(58) Field of Classification Search
USPC ................. 382/154, 171, 216, 267, 209, 282; 345/419, 422, 424, 653
See application file for complete search history.

(56) References Cited

U.S. PATENT DOCUMENTS 6,919,892 B1 *  7/2005  Cheiky et al. ................. 345/473
7,027,054 B1 *  4/2006  Cheiky et al. ................. 345/473
(Continued)

FOREIGN PATENT DOCUMENTS

KR   10-2011-0052993 A   5/2011
WO   2013/148308 A1   10/2013

OTHER PUBLICATIONS

International Search Report and Written Opinion received for PCT Patent Application No. PCT/US2013/031967, mailed on Jun. 28, 2013, 11 pages.

(Continued)

*Primary Examiner* — Yosef Kassa
(74) *Attorney, Agent, or Firm* — Green, Howard & Mughal, LLP

(57) ABSTRACT

Methods, systems, and computer program products to warp a depth map into alignment with an image, where the image sensor (e.g., camera) responsible for the image and depth sensor responsible for an original depth map are separated in space. In an embodiment, the warping of the depth map may be started before the original depth map has been completely read. Moreover, data from the warped depth map may be made available to an application before the entire warped depth map has been completely generated. Such a method and system may improve the speed of the overall process and/or reduce memory requirements.

24 Claims, 14 Drawing Sheets

(56) References Cited

U.S. PATENT DOCUMENTS

| | | | |
|---|---|---|---|
| 7,133,041 B2 * | 11/2006 | Kaufman et al. | 345/419 |
| 7,212,203 B2 * | 5/2007 | Payne | 345/420 |
| 7,471,291 B2 * | 12/2008 | Kaufman et al. | 345/424 |
| 8,311,366 B2 * | 11/2012 | Schiewe et al. | 382/294 |
| 8,350,852 B2 * | 1/2013 | Barth et al. | 345/420 |
| 8,553,037 B2 * | 10/2013 | Smith et al. | 345/473 |
| 8,643,701 B2 * | 2/2014 | Nguyen et al. | 348/47 |
| 8,995,777 B2 * | 3/2015 | Peters et al. | 382/224 |
| 2010/0039560 A1 | 2/2010 | Han | |
| 2011/0025827 A1 | 2/2011 | Shpunt et al. | |
| 2011/0115886 A1 | 5/2011 | Nguyen et al. | |
| 2011/0128352 A1 | 6/2011 | Higgins et al. | |

OTHER PUBLICATIONS

International Preliminary Report on Patentability and Written Opinion Received for PCT Patent Application No. PCT/US2013/031967, mailed on Oct. 9, 2014, 8 pages.

* cited by examiner

SYSTEMS, METHODS, AND COMPUTER PROGRAM PRODUCTS FOR LOW-LATENCY WARPING OF A DEPTH MAP

TECHNICAL FIELD

Embodiments described herein generally relate to image processing.

BACKGROUND

Depth maps and images together may constitute the primary input of many applications, such as video surveillance, video games (e.g., the Microsoft Kinect), hand gesture interpretation and other applications that take input unobtrusively from an un-instrumented user. Other related applications that take depth maps and images as input may include those that analyze the 3D environment around a sensor, for instance for autonomous control of a robot or vehicle or a safety monitoring system.

In some cases, the design of such applications may be easier if the depth map and image are registered or aligned, in the sense that the depth map is, or made to appear to be, produced by a depth sensor that is placed at the same physical location as the imaging sensor that produced the image. When this is the case, the pixels of the depth map may be put into correspondence with the pixels of the image, and vice-versa.

In practice, however, the depth map and the image are often produced by different sensors and consequently may be imaged from distinct physical locations. Fortunately, it may be possible to warp a depth map or image in such a way that it appears nearly as seen from a different center of projection.

BRIEF DESCRIPTION OF THE DRAWINGS/FIGURES

Figure 1:
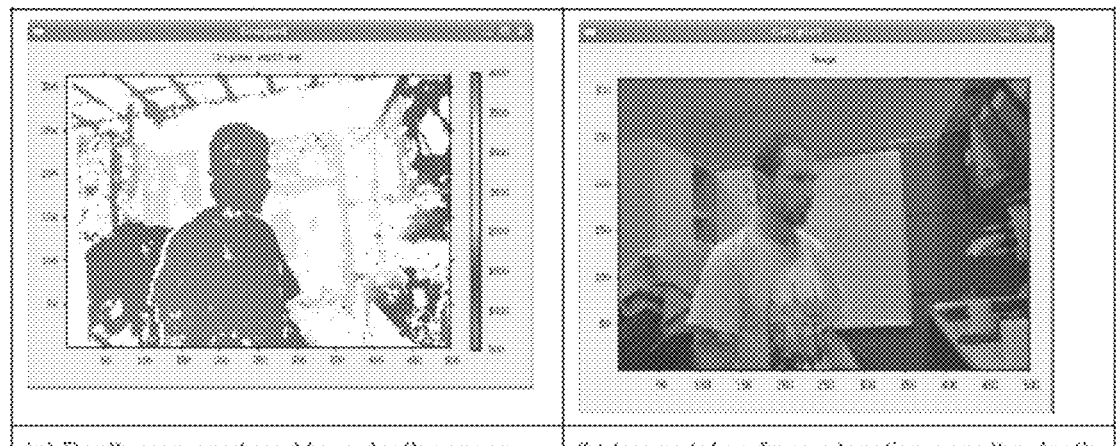
FIG. 1 illustrates the results of an embodiment of a depth map warping process.
Figure 1:
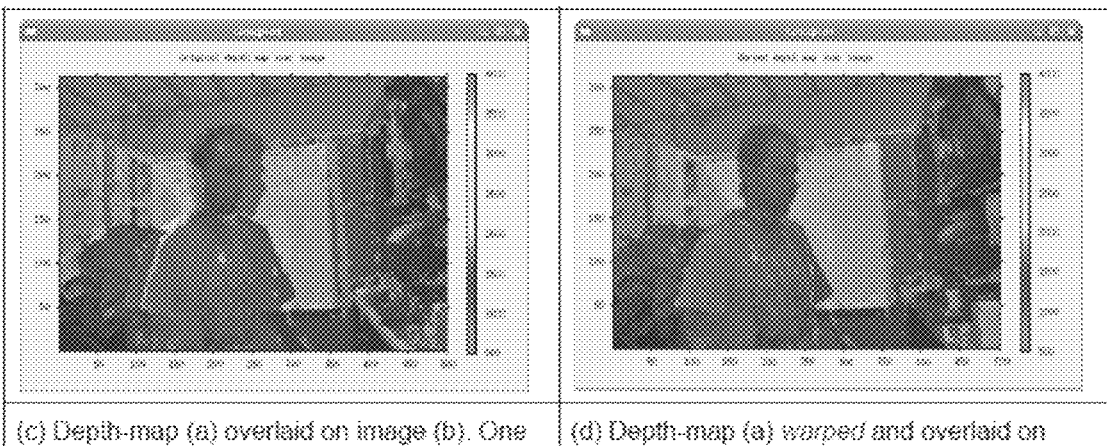

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the scope of the description. It will be apparent to a person skilled in the relevant art that this can also be employed in a variety of other systems and applications other than what is described herein.

Disclosed herein are methods, systems, and computer program products to warp a depth map into alignment with an image, where the image sensor (e.g., camera) responsible for the image and depth sensor responsible for an original depth map are separated in space. In an embodiment, the warping of the depth map may be started before the original depth map has been completely read. Moreover, data from the warped depth map may be made available to an application before the entire warped depth map has been completely generated. Such a method and system may improve the speed of the overall process and/or reduce memory requirements.

Warping an intensity image to match the perspective of a depth map may be significantly harder than mapping a depth map to the perspective of an image: if there are reliable depth map values at all pixels, then such a warping would produce an image that appears to be produced from the same physical location as the depth map. However, for many depth sensors, there may be pixel locations that do not have reliable measurements. When three-dimensional (3D) scene information is not available, the warping of intensity pixels may be done based on an estimate of depth determined from other locations. For instance a common estimation technique may be to assume that the region is planar, and derive the parameters of the 3D plane from either nearby or even global image values. When estimates do not correspond to true 3D structure, they may result in errors or artifacts in the warped image, where objects may appear to be torn or stretched after the warping. The methods and systems for warping a depth map to an image, in contrast, may produce improved results because only values which have known 3D locations may be warped, so output values may appear to maintain their shape and size from the original unwarped view. Another advantage is that warping a depth map to an intensity image may not create artifacts in the intensity image, since the intensity image is not being changed.

The results of warping a depth map are illustrated in example image set 100 FIG. 1, according to an embodiment. An original depth map is shown at (a), and an image taken with a nearby camera is shown at (b). The results of directly overlaying the depth map (a) over the image (b) is shown at (c). Note the misalignment between the depth-map and image. The overlay of a warped version of depth map (a) on the image (b) is shown at (d). Note the smaller gaps and other small artifacts, but also that the depth map and image are relatively well aligned.

Warping a Depth Map

Depth Sensor|

A depth sensor may produce physical measurements of the space within its field of view. It may periodically produce a depth map, or collection of depth measurements. Each measurement may indicate the distance along a physical line to the first physically occupied point on this line. Examples of depth sensors may include, without limitation, stereo cameras, time-of-flight laser scanners, structured light 3D sensors, radar, lidar and sonar sensors. A depth map may be described as a collection of measurements (x(n), y(n), z(n)), for $1 \leq n \leq N$, where N is the number of pixels to be mapped.

The measurements may be considered in a two-index array (x(i,j), z(i,j)) for $1 \leq i \leq W$ and $1 \leq j \leq H$ where W and H represent the width and height of the map.

The pair (i,j) may define a 2D pixel location and z(i,j) may define the depth of a pixel at this location.

This 2D array may be output from the depth sensor as a stream of measurements of pixels in raster order, beginning data output at the upper left pixel, and progressing across the top row from left to right, then returning to the beginning of the next row, etc., etc., until the bottom right pixel is reached.

The measurements may be taken along regularly spaced rays emanating from a single 3D point called the center of projection of the sensor. The coordinate system may be chosen such that the center of projection has coordinates (0, 0, 0). In this case, the measurements may have the particular form $(x(i,j), y(i,j), (1,j))=z(i,j) \cdot (i/g_u-u_0, j/g_v-v_0, 1)$, where $(u_0, v_0)$ may be called the principal point of the depth map, and $g_u$ and $g_v$ are focal lengths, in pixels, of the depth map. In this case, a depth map may be represented by the values W, H, $u_0$, $v_0$, $g_u$, $g_v$ and the measurements z(i,j) for $1 \leq i \leq W$ and $1 \leq j \leq H$. In some sensors, the depth measurements may be represented by a quantity called disparity (d), proportional to the inverse of the depth, $d(i,j)=k/z(i,j)$, where k is a known constant.

Camera

A camera may produce radiometric measurements of the space within its field of view. It may periodically produce an image, or collection of these measurements. Each radiometric measurement may provide some information about the intensity, frequency and/or polarization of the electromagnetic waves traveling along a physical line, from a point on the line towards the camera at the time of the measurement. For example, a color camera may produce measurements R, G and B of the respective red, green and blue components of the visible light traveling along a ray.

Cameras may produce data in raster order, beginning data output at the upper left pixel, and progressing across the top row from left to right, then returning to the beginning of the next row, etc., until the bottom right pixel is reached. This sequence of pixels in raster order may be referred to as a stream of pixels, or a pixel stream.

I(i,j) may refer to the camera measurement at pixel location (i,j). It may be possible to efficiently compute the image location (u,v) at which a 3D scene point (x, y, z) projects. In the case of a perspective camera, for example, a 3D point with coordinates (x, y, z), in a reference frame centered at the principal point and with X and Y axes parallel to that of the image plane, may project to the image location $(u, v)=(x/z, y/z)$, (u, v) may be termed the projection of (x, y, z).

The pixel location (i, j) corresponding to (u, v) may be given by $(i, j)=(f_u(u+u_0), f_v(v+v_0))$, where $f_u$ and $f_v$ are the X- and Y-focal lengths of the camera and $(u_0, v_0)$ is the principal point of the camera. In an embodiment, some rounding may take place in approximating the real-valued pair $(f_u(u+u_0), f_v(v+v_0))$ by an index pair.

Note that in this document, a perspective camera is described for illustration purposes, but the description herein may apply to any camera for which the 2D projection of 3D points can easily be computed, such as catadioptric cameras.

Warping Operation

In an embodiment, a warping operation may transform a depth map, produced by a sensor at one location, into a depth map similar to one produced by the sensor at a different location (T) viewing the same scene. For each pixel in the original depth map which has a measurement, a similar procedure may be followed. First, the 3D coordinate of the world point represented by the pixel may be computed from the row and column indices in the depth map, the depth measurement at the pixel, and the parameters of the sensor if necessary (e.g., principal point and focal lengths). Next, the coordinates of the same 3D point in the coordinate system centered at T may be computed. Then the 2D coordinates of the projection of the transformed 3D point in the new depth map may be computed. The depth value in the new coordinate system may then be stored at the appropriate row and column indices in the new depth map. In more precise notation, the sensor is located at (0,0,0), and the original depth map may be warped to one as seen from the perspective of a sensor located at $T=(T_x, T_y, T_z)$. The transformed depth value may be written as part of the coordinates $(x_T(i', j'), y_T(i',j'), z_T(i', j'))$, with the depth as $z_T(i', j')$ for i' in 1, . . . W' and j' in 1, . . . H'.

Figure 2:
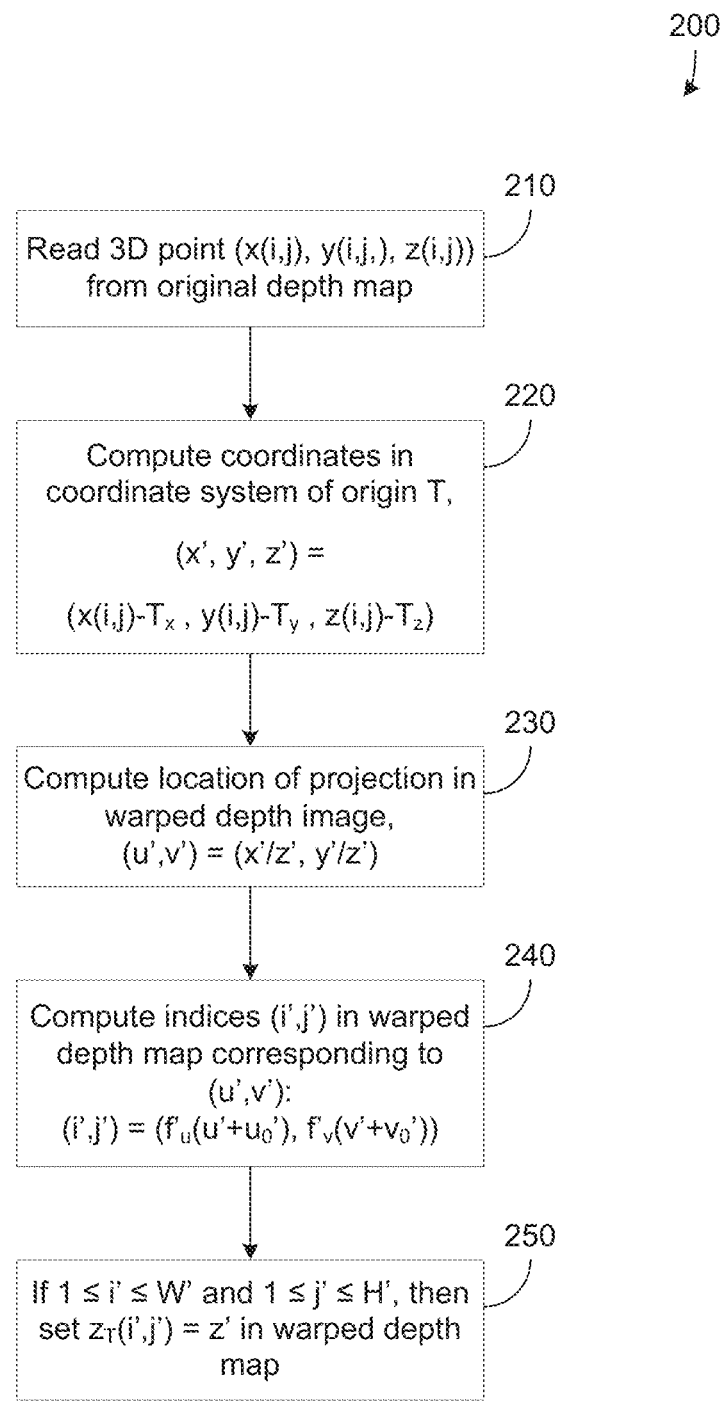
FIG. 2 is a flowchart illustrating a depth map warping process, according to an embodiment.

An embodiment of a warping process is illustrated in process 200 of FIG. 2. This process may be performed for each pixel in an original depth map having a depth z(i, j). At 210, a 3D point (x(i,j), y(i,j), z(i,j)) may be read from the original depth map. At 220, corresponding coordinates in the coordinate system of origin T may be computed, $(x', y', z')=(x(i,j)-T_x, y(i,j)-T_y, z(i,j)-T_z)$. At 230, the location of the projection in the warped depth image may be calculated. In the case of a sensor with a single center of projection and with the same orientation as the depth sensor, this may be calculated as $(u', v')=(x'/z', y'/z')$. At 240, indices (i', j') in the warped depth map corresponding to (u', v') may be calculated as $(i', j')=(f_u(u'+u'_0), f_v(v'+v'_0))$. At 250, if $1 \leq i' \leq W'$ and $1 \leq j' \leq H'$, then $z_T(i', j')$ may be set to z'.

The calculations described in the above warping process are given for illustration purposes and may be replaced by other similar calculations. For example, in the case of a depth sensor and camera similar to the previous illustration, but with different orientations, related by a known 3-by-3 rotation matrix R, coordinates (x',y',z') may be computed by $R \cdot (x(i,j)-T_x, y(i,j)-T_y, z(i,j)-T_z)$, where "·" represents the product of a 3-by-3 matrix by a three dimensional vector. For example, in the case of a depth sensor and a camera which both have a unique center of projection and which have identical image planes (physical or rectified), it is possible to forgo the 3D calculation and replace it entirely by a much simpler calculation in disparity space.

Lowering Latency

Constructing a Warped Depth Map from an Original Depth Map

Figure 3:
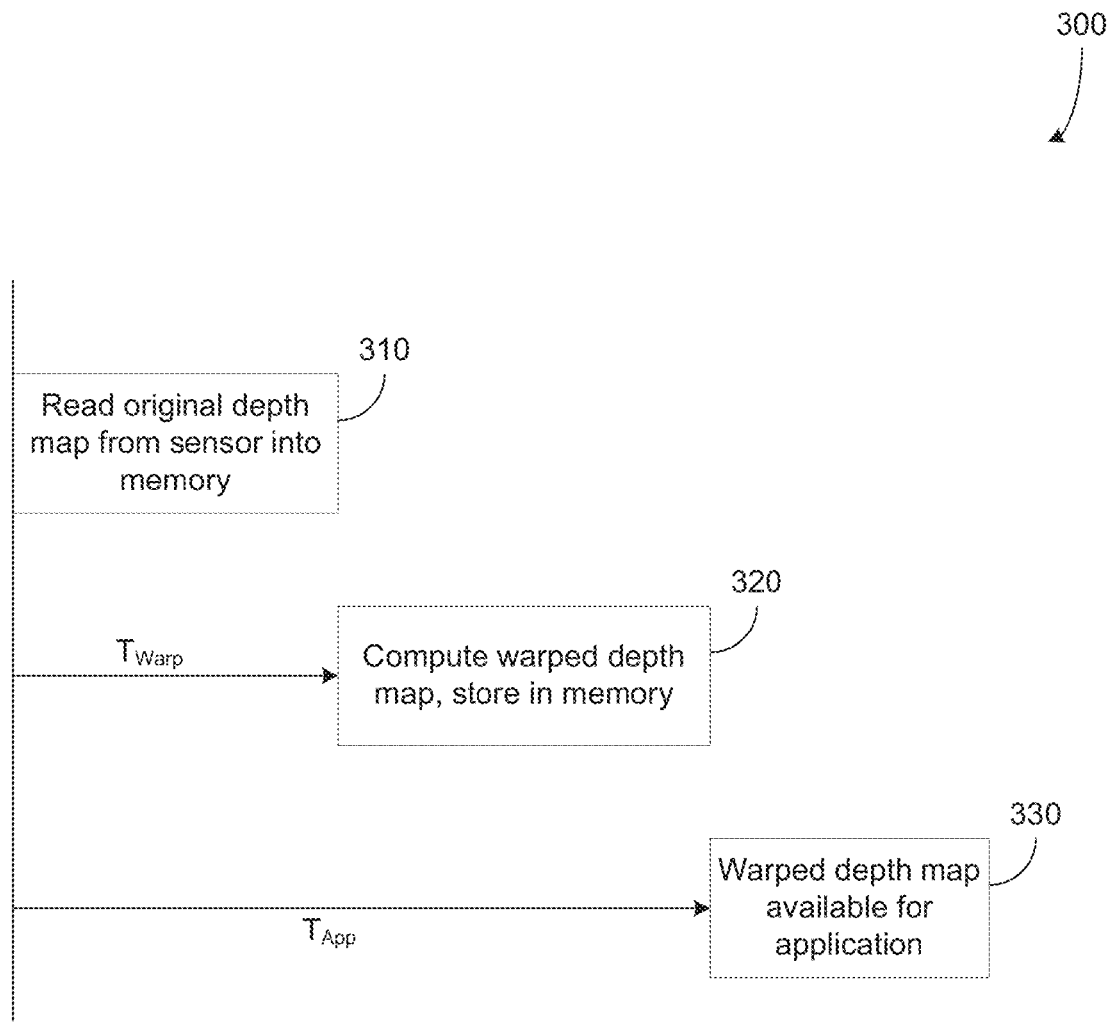
FIG. 3 illustrates a timeline of a depth map warping process, according to an embodiment.

In a conventional depth mapping system, the reading of the original depth map may be completed before beginning the warping process. Once the warping process is completed and the warped depth map generated, the data in the warped depth map can be made available for an application. In the above method, it may be necessary to wait for the entire original depth map to be processed before the application can start using the warped depth map. This process is illustrated in process 300 of FIG. 3. At 310, the original depth map may be read from the depth sensor into a memory. At 320, the warped depth map may be computed. At 330, the warped depth map may be made available for an application. The duration between the onset of the capture of the original depth map and the instant the warping process starts is shown as $T_{Warp}$. The duration between the onset of the capture of the original depth map and the instant the application process can start reading the warped depth map is shown as $T_{App}$.

Depth sensors may produce their output in a sequential order, so that the original depth map can be read directly from the depth sensor. In an embodiment, the warping process may read the original depth map as it is being produced, or with otherwise reduced latency. Consequently, in such an embodiment there may be no need to store the entire original depth map, thus reducing the memory requirements of the system; the warping process may start earlier and thus terminate earlier than it otherwise would.

The final depth value of a pixel in the warped depth map may be computed only from pixels within a limited bounded region of the original depth map, in an embodiment. Therefore, once all the pixels in this bounded region of the original depth map have been processed, the value of the considered pixel in the warped image may not be changed any more. The application that uses the warped depth map may consequently start processing the considered pixel at that moment. The application may therefore start processing the warped depth map before it has been entirely computed. More detailed discussion of the computation of the size of the bounded region is given below, according to an embodiment.

More precisely, for any pixel n' in the warped depth map, where $1 \leq n' \leq N'$ and is the size of the warped depth map, there is a set, A(n'), of pixels in the original depth map where these pixels may influence the final depth value z(n') of n'. That is, pixels outside this set A(n') may not influence the final value of pixel n' of the warped depth map. This set may be referred to herein as the bounded region of origin of the considered pixel n' in the original depth map. Once all the pixels in the bounded region have been processed, the associated pixel n' of the warped depth map may be output in an embodiment. In some situations, not all pixels n in A(n') of the original depth map will be processed simultaneously. Instead, they may be processed in a predefined order, such as raster order. For any particular processing order of an original depth map and for any pixel n' of the warped depth map, there is a "last" pixel l(n') of A(n'), such that once l(n') has been processed, all pixels in A(n') have been processed and thus the final value of pixel n' of the warped depth map may not be further modified by the warping process.

Conversely, for any pixel n of the original depth map, there may be a set of pixels S(n) in the warped depth map, consisting of pixels n' such that n is the last pixel that may influence the value of the warped depth map at n', i.e., l(n')=n. Stated differently, $S(n) = \{n' | l(n') = n\}$.

As will be discussed in greater detail below, the bounded region may be computed based on a transform describing the relationship between the actual 3D position of the depth sensor and the 3D position of the intensity camera view, the operating range of the depth sensor, and other parameters of the algorithm such as interpolation and filling neighborhood. The bounded region for any output depth pixel may be computed before the warping starts. Results indicating what pixel in the output depth map is ready at any point during warping operation may therefore be stored in a lookup table. As used herein, the term "ready" may refer to the status of a pixel or row in the warped depth map as having been completely determined.

Figure 4:
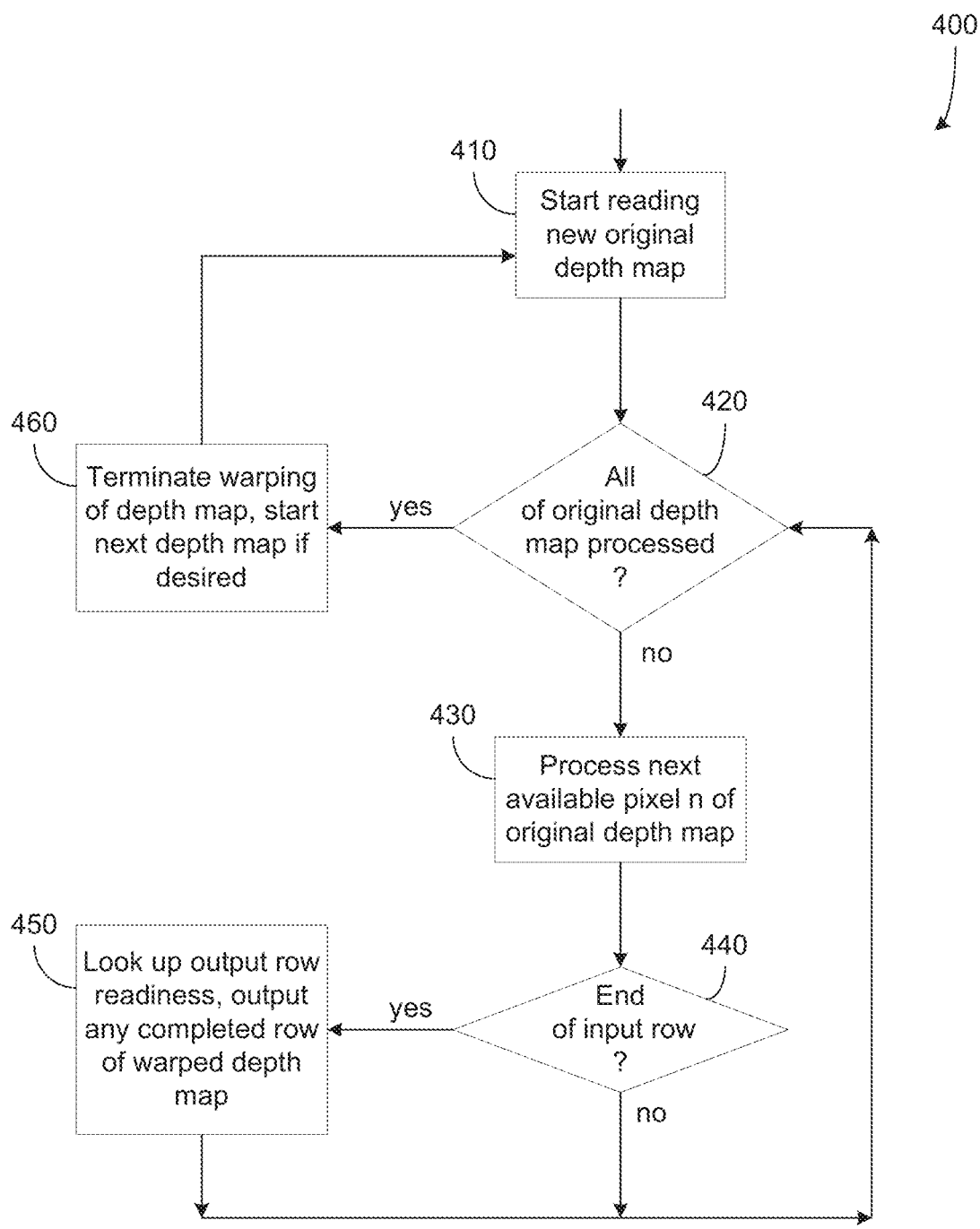
FIG. 4 is a flowchart illustrating reduced-latency depth map warping, according to an embodiment.

It may be more practical to store these results in larger aggregated groups, for instance, aggregated by row. In an embodiment, a look up table with H entries, where H is the number of rows in the input depth map, may be created. This table may contain at each entry the corresponding row of the output depth map which will be ready at the completion of processing the given input row. This is illustrated in process 400 of FIG. 4 according to an embodiment. At 410, reading of a new (as yet unprocessed) original depth map may begin. At 420, the determination may be made as to whether all of the original depth map has been processed. If not, then at 430, the next available pixel of the original depth map may be processed. At 440, a determination may be made as to whether the end of an input row has been reached, and if not, then processing may continue at 420, or alternatively at 430. If so, then at 450, the lookup table may be accessed to determine if an output row is ready; any completed ready rows may then be output and/or made available to an application, and processing may continue at 420. If, at 420, it is determined that the original depth map has been completely processed, then the warping process may terminate and processing of a next depth map may be commenced if desired.

Figure 5:
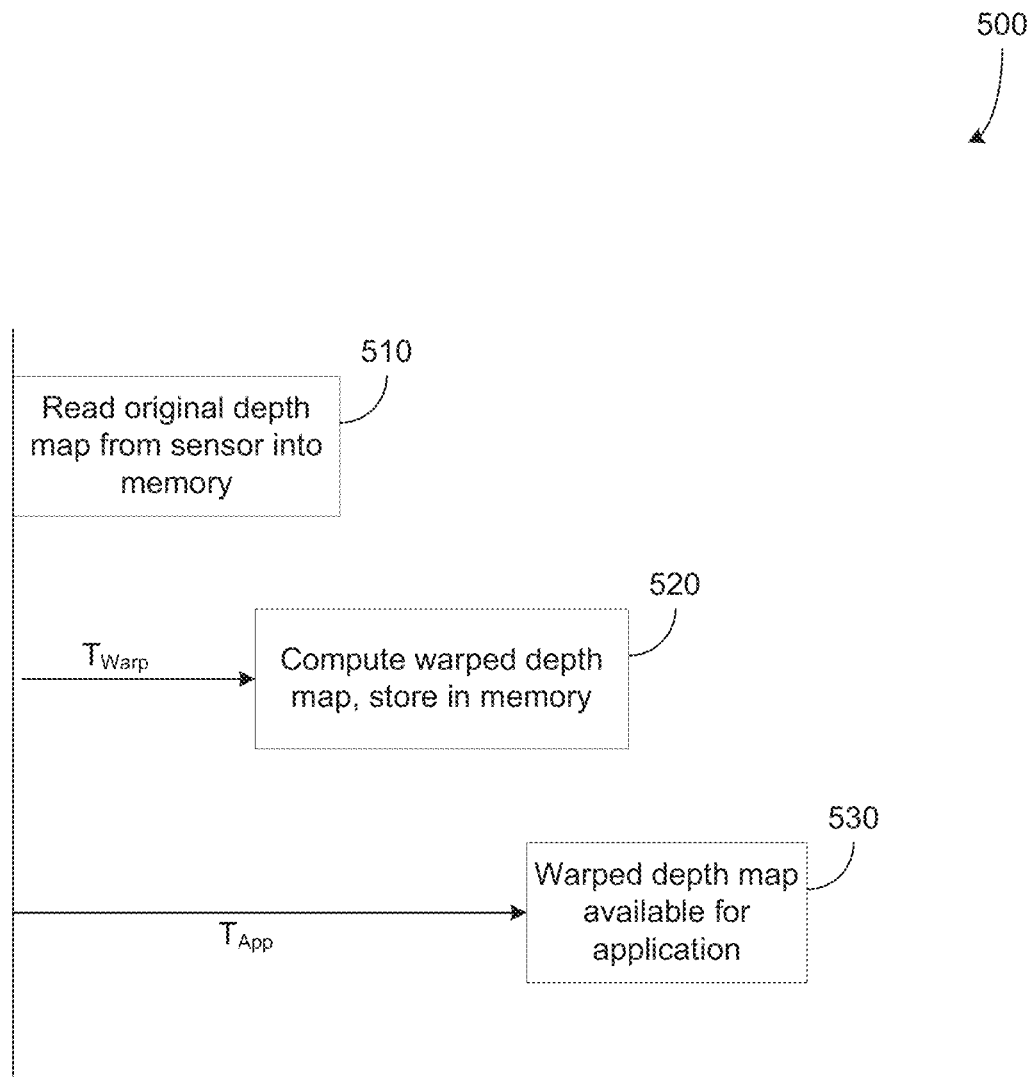
FIG. 5 illustrates a timeline of a reduced-latency depth map warping process, according to an embodiment.

With such an embodiment, one may obtain a process that has a time-chart as shown in process 500 of FIG. 5. This figure shows how overlapping the reading (510), computation (520) and application (530) processes may reduce the time spent processing an image. In an embodiment, the first pixel of the original depth map may be available as soon as it is computed (in which case $T_{Warp}$ may be close to 0), or soon thereafter. In particular, the latency between the moment data starts to be available from the depth sensor and the moment the application may start processing the warped depth map may be lowered, since the reading of the original depth map does not need to be completely finished before beginning warping. Note that amount of overlap between the reading process 510 and the warping computation 520 is shown conceptually in this figure. The amount of reduction in latency may vary in different embodiments.

The overlap in the warping computation 520 and the application 530 will be discussed below.

Taking Occlusions into Account

In embodiments described above, a transformed depth value may be stored into the output warped depth map. Instead of just overwriting any value which may already be stored at that location, a change may be introduced whereby the new depth value may first be read, and used to overwrite a pre-existing value in the output warped depth map when the new value is closer to the camera, i.e., has a smaller depth value. An embodiment of such a warping process is illustrated in process 600 of FIG. 6. In an embodiment, this process is similar to that of FIG. 2, with the last element replaced as described here. As in FIG. 2, the process of FIG. 6 may be performed for each pixel (i, j) in the original depth map having a depth measurement. At 610, a 3D point (x(i,j), y(i,j), z(i,j)) may be read from the original depth map. At 620, corresponding coordinates in the coordinate system of origin T may be computed, $(x', y', z') = (x(i,j) - T_x, y(i,j) - T_y, z(i,j) - T_z)$. At 630, the location of the projection in the warped depth image may be calculated. In the case of a sensor with a single center of projection, this may be calculated as $(u', v') = (x'/z', y'/z')$. At 640, indices (i', j') in the warped depth map corresponding to (u', v') may be calculated as $(i', j') = (f_u(u' + u'_0), f_v(v' + v'_0))$.

At 650, the determination may be made as to whether $1 \leq i' \leq W'$ and $1 \leq j' \leq H'$. If so, then at 660, the determination may be made as to whether the depth measurement $z_T(i',j')$ has been previously set. If so, then at 670, a determination may be made as to whether $z_T(i',j') > z'$. If so, then at 680, $z_T(i',j')$ is changed to the value z'. If, at 660, it is determined that $z_T(i',j')$ has not already been set, then at 680, $z_T(i',j')$ is set to the value z'. Note that with this change, the resulting depth map may be viewed as serving as a z-buffer.

Reducing Sparseness in the Resulting Depth Map

In an embodiment, the warped depth map may not be completely filled using the processes described so far. This can occur for a number of reasons. The original depth map may not be completely filled. Also, the warping may render multiple pixels of the original depth map into a single pixel of the new depth map; this can happen because of the viewpoint change, or simply because of rounding in the computation. This may leave other pixels with no measurements. Moreover, at most W*H pixels of the warped depth map may be set, so that, if the warped depth map has more pixels than the original, some pixels of the warped depth map will not be set.

Filling of "holes" in the warped depth map may be performed as part of the warping algorithm, according to embodiments. Various approaches to filling such holes are described below.

One approach to hole filling may involve adding an explicit filling step after the mapped pixels are rendered to the new depth map (as described above), before they are output to a receiving application. The output is delayed until a small neighborhood around an output pixel is considered ready. In an embodiment, any pixels that do not have depth values can be filled by considering the surrounding valid (i.e., not missing) depth values. There are a number of methods for filling such a hole including, but not limited to: repeating the nearest neighboring value that is valid, interpolating values based on the several nearest surrounding valid values (e.g., assuming a planar surface), or filling based on the average, median, or mode of the nearest valid neighbors. In other embodiments, filling processes might estimate possible discontinuities in the scene and not include depth neighbors that are across a discontinuity. Noise reduction may also be performed in this step. For instance a single depth value that is surrounded on all sides for some distance by empty depth pixels, may be considered a noise value and removed.

Another approach to hole filling may temporarily store the warped location and depth of each mapped pixel in the new sensor coordinate system instead of rendering it directly into the new depth map, according to an embodiment. When the mapped coordinates of pixels from a small neighborhood around the original pixel have been computed, these 3D coordinates may be used to define a polygon, and projected into the new depth map. Interpolation may be used to render output pixel values covered by the mapped polyeron. This method may be used, for example, in situations in which the size of the output depth map is larger than the original map. This is described in more detail as follows.

In such an embodiment, a neighborhood of the mapped values z' (and, if desired, x' and y' as well) may be stored, as well as real-valued pixel locations (a'(i,j), b'(i,j)) in the warped depth map. For notation purposes, x', y', and z' are the respective values x'(i, j), y'(i,j), and z'(i,j) computed on the basis of the pixel (i,j) of the original depth map.

In this approach, values in the resulting depth map may be interpolated: the value at a pixel (i', j') in the warped depth map may be interpolated from the values (x'(i,j), y'(i,j), z'(i,j)) at neighboring locations (u'(i,j), v'(i,j)) that surround (i', j'). In an embodiment, interpolation neighborhoods may be of size F×G pixels.

Figure 7:
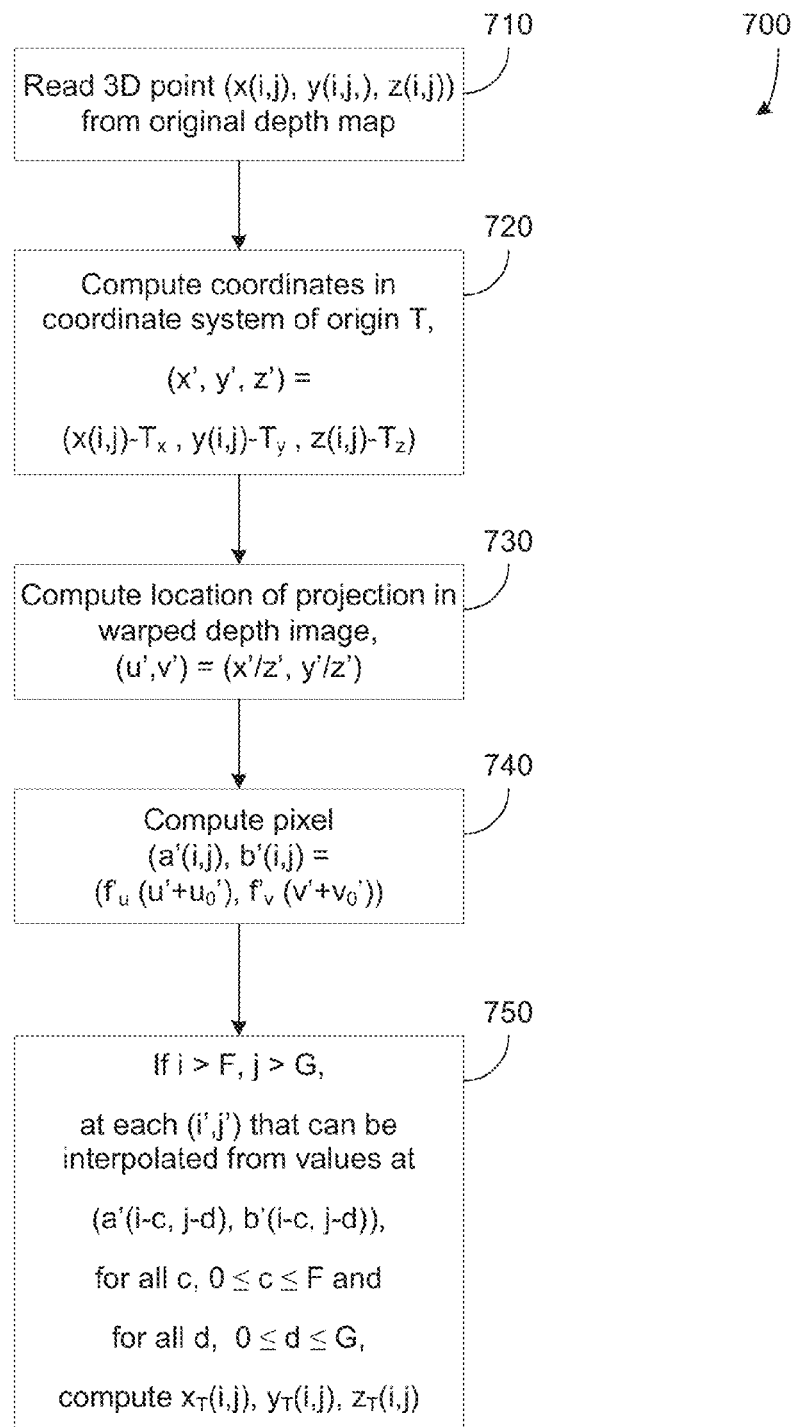
FIG. 7 is a flowchart illustrating a reduced-latency depth map warping process that remediates sparseness conditions, according to an embodiment.

An embodiment of this approach is illustrated in process 700 of FIG. 7. This process may loop row by row (or column by column) over pixels (i,j) in the original depth map. At 710, a 3D point (x(i,j), y(i,j), z(i,j)) may be read from the original depth map. At 720, corresponding coordinates in the coordinate system of origin T may be computed, (x', y', z')=(x(i,j)−$T_x$, y(i,j)−$T_y$, z(i,j)−$T_z$). At 730, the location of the projection in the warped depth image may be calculated. In the case of a sensor with a single center of projection, this may be calculated as (u', v')=(x'/z', y'/z'). At 740, the pixel (a'(i,j), b'(i,j)) may be computed as ($f'_u$(u'+$u'_0$), $f'_v$(v'+$v'_0$)). At 750, if i>F and j>G, at each (i', j') that can be interpolated from values at the pixel locations (a'(i-c, j-d), b'(i-c, j-d)) for all c between 0 and F and all d between 0 and G, interpolated values $x_T$(i,j), $y_T$(i,j), $z_T$(i,j)) may be computed.

Figure 8:
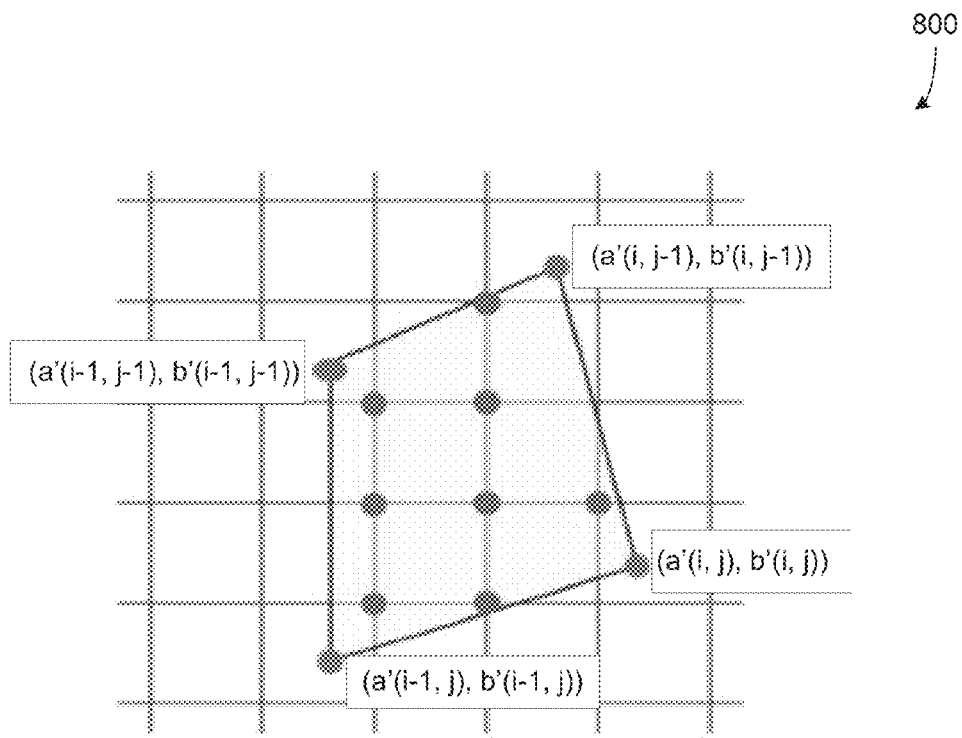
FIG. 8 illustrates sparseness remediation, according to an embodiment.

FIG. 8 illustrates an exemplary interpolation 800 that may occur at 750, in the case F=G=2. The real-valued pixel locations (a'(i-c, j-d), b'(i-c, j-d)) are shown as the dots at the corners of the polygon, while the values (i',j'), at which it may be possible to determine interpolated values, are shown as the dots inside the polygon. Starting at the lower right and moving clockwise, the locations at the corners of the polygon are shown as (a'(i,j), b'(i,j)), (a'(i−1, j), b'(i−1, j)), (a'(i−1, j−1), b'(i−1, j−1)), and (a'(i, j−1), b'(i, j−1)).

In various embodiments, this process may be implemented using any appropriate interpolation method known to persons of ordinary skill in the art. For example, with F=G=1 It may be possible to use nearest-neighbor interpolation; with F=G=2 it may be possible to use bi-linear interpolation; with F=G=4 it may be possible to use bicubic interpolation. A different interpolation mechanism may be used to compute interpolated values if part of the values are missing. For example, with F=G=2, if one, two or three values are missing, then values may still be found using nearest neighbor interpolation.

In an embodiment, it may only be necessary to store G rows (if the depth map is scanned row-by-row) or F columns (if the depth map is scanned) column-by-column) of warped depth map values (x'(i,j), y'(i,j), z'(i,j)) and locations (u'(i,j), v'(i,j)).

Note that in various embodiments, the above approaches to reducing sparseness may be used in conjunction with the above-described processes for handling occlusions in a warped depth map.

Determining when Reading of the Warped Depth Map May Start

As stated above, in an embodiment the value of the warped depth map at a pixel (i',j') may be read or otherwise made available to an application before all the pixels (i,j) in the original depth map have been processed by the warping process. The idea is to determine, for a given warped depth map pixel (i',j'), a region A(i',j') of pixels in the original depth map that may influence the value of z'(i',j') within the course of the warping algorithm. This region may be represented by a bounding rectangle [$C_{min}$(i',j'), $c_{max}$(i',j')]×[$R_{min}$(i',j'), $R_{max}$(i'j')], where $C_{min}$ and $C_{max}$ may represent the boundary columns of the region, and $R_{min}$ and $R_{max}$ may represent the boundary rows of the region.

To determine the region A(i',j'), note that all depth sensors may have a bounded range of possible measurements z. There may exist known bounds $z_{min}$<$z_{max}$≤∞ such that, at any pixel (i, j), $z_{min}$(i,j)≤$z_{max}$. Consequently, the z' values in the warped depth map will also be bounded by $z'_{min}$=$z_{min}$-$T_z$ and $z'_{max}$=$z_{max}$-$T_z$.

A pixel (i',j') in the warped depth map may correspond to a 3D point that lies on the 3D line segment {z'(i'/$f_x$-$u_0$', j'/$f_y$-$v_0$', 1)+T|$z'_{min}$≤z'≤$z'_{max}$}. The projections, in the original depth map, of the points on this 3D segment may, in general, form a curve. The bounding box for this curve may be determined based on $z_{min}$ and $z_{max}$. In the case of a depth sensor with a perspective projection model, this curve may be a 2D line segment defined by the projections of the extremities of the 3D line segment (the points at z'=$z'_{min}$ and z'=$z_{max}$). A tight bounding box of this 2D line segment may be defined by the extremities of this line segment.

In an embodiment, it may often be convenient to start reading a row j' of the warped depth map as soon as all the pixels in the row are ready to be read: one may thus start reading the row j' as soon as the row max $\{R_{max}(i', j')|1 \leq i' \leq W\}$ in the original depth map has been processed, thereby further reducing latency. This is illustrated in process 900 of FIG. 9, according to an embodiment. At 910, a determination may be made as to whether row max $\{R_{max}(i', j')|1 \leq i' \leq W\}$ in the original depth map has been processed. If so, then at 930, row j' may be read. If not, then processing may return to 910. Note that the warping process may continue throughout the illustrated operation, so that additional pixels are being processed as the condition stated in 910 is monitored.

When the warping algorithm can process each pixel in the original depth map in a bounded time, it may be convenient to read the warped depth map on a fixed schedule defined by a starting offset (taken with respect to the start of the warping algorithm) and a speed at which the pixels are read. As would be known to a person of ordinary skill in the art, it may be possible to determine an offset and reading speed that guarantee that the values are not read prematurely.

Example of Determining when the Warped Depth Map can be Read

In an embodiment, this determination may be done in the case of a depth sensor and camera that are close to each other. In this example, it may be assumed that the distance $z_{min}$ is 5 times or more greater than the distance between the depth sensor and camera, a situation that may be obtained by juxtaposing a current depth sensor and camera. It may be assumed that the depth sensor and camera point in the same direction.

In this case, a point at infinity may appear in the same location in the image plane of the camera and in the image plane of the depth sensor, so that the minimum parallax between the depth sensor and camera is zero.

Bounding the total parallax between depth map and image may be desirable. In this same sensor configuration, and assuming a realistic field of view of 45 degrees for both sensors, then it may be shown that the maximum parallax between the depth sensor and camera would be at most one quarter of the size of the depth map or image. If the field of view were greater, as is the case in many sensors, then this maximum parallax may become smaller.

Bounding of vertical parallax may also be desirable. If, for example, the camera lies on the left or on the right of the depth sensor (as opposed to above or below), then the vertical parallax between their views may be only a fraction of the total parallax between their views and thus be very limited. It may be assumed that the vertical parallax is less than one eighth of the size of the image.

In addition, extra padding for interpolation may be advantageous, it may be assumed that the depth map is being read out row by row. Taking into account the G pixels used for depth interpolation (G may be small with respect to the image), it may be concluded that, for a given pixel (i',j') in the warped depth map, the set of pixels in the original depth map that can influence the value of the warped depth map in (i',j') may be in a region that is not higher than one sixth, and no wider than one quarter of the original depth map. As a consequence, it may be possible to start reading out the first pixel of the warped depth map as soon as one quarter of the original depth map has been warped.

The specific parameters used in this example are for illustration purposes, to show that it may be determined when to start reading a depth map based on the relative positions of the depth sensor and camera and on their fields of view. The figure of one quarter of the original depth map may be slightly larger or smaller, but in general may be substantially less than the size of the full depth map. In particular, if the depth sensor and camera are well aligned, then the vertical parallax may be small and consequently a pixel in the warped depth map may be on almost the same row as the pixels (in the original depth map) it was computed from, and the delay before one can start reading the output depth map may be further reduced.

The speed at which the warped depth map can be read out may be determined based on the speed at which the warping processes each pixel and on the speed at which the application processes each pixel.

Description of an Example Implementation

Figure 10:
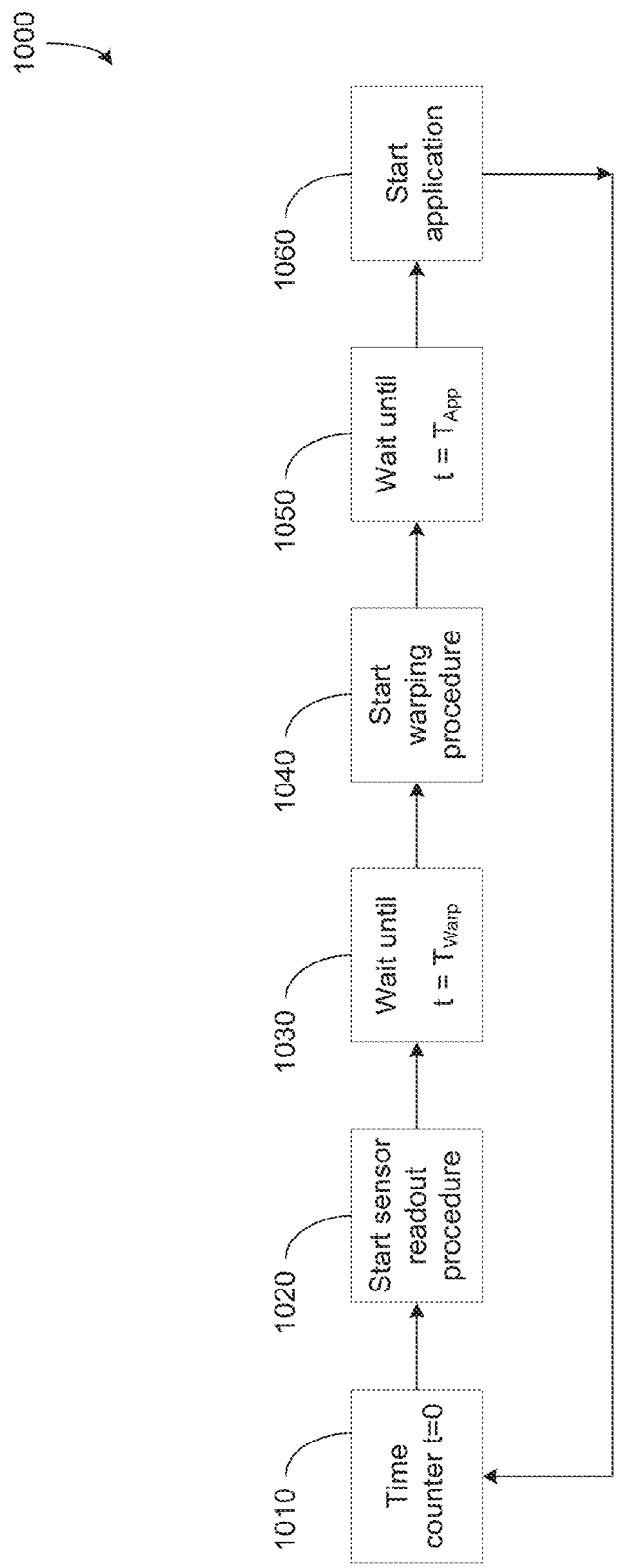
FIG. 10 is a timeline illustrating a reduced-latency depth map warping process, according to an embodiment.

FIG. 10 illustrates a process 1000 that warps a depth map in alignment with an image, according to an embodiment. This process starts at time t=0, as shown at 1010. At 1020, readout from the depth sensor may be started. The process may then wait at 1030, until $t=T_{Warp}$. At that point, the warping procedure may start as shown at 1040. Here, the warping procedure may read from a first memory buffer and write a resulting warped depth map into a second memory buffer. The process may then wait at 1050 until $t=T_{App}$. The data from the warped depth map may then be available for an application starting at 1060.

Application to a Trinocular System

Figure 11:
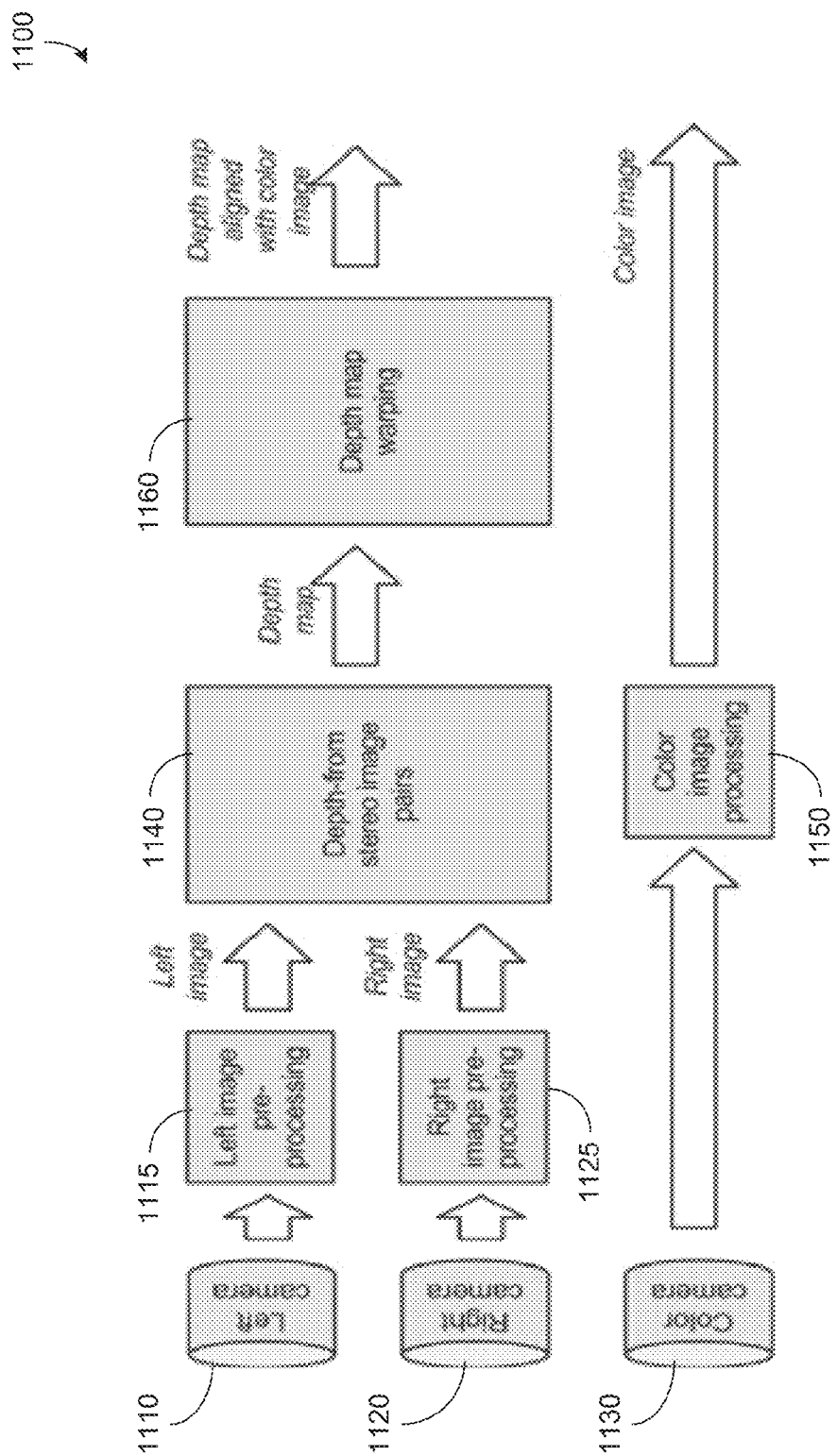
FIG. 11 is a block diagram illustrating an example of a system in which reduced-latency depth map warping may be implemented, according to an embodiment.

The methods and systems described herein may be implemented in a trinocular system as illustrated in FIG. 11, according to an embodiment. Generally, such a system may include a stereo depth sensor and a camera. The methods and systems described above may be implemented whether the stereo depth sensor has monochrome cameras, color cameras, infrared cameras, near-IR cameras, ultraviolet, multispectral or other types of cameras. A camera may be monochrome, color, infrared, nea-IR, ultraviolet, multispectral or otherwise. For the purpose of illustration, a color camera is discussed below.

The embodiment of FIG. 11 shows a trinocular system 1100 in which two cameras 1110 and 1120 are part of a stereo depth sensor and the third camera 1130 is a color camera. The left and right image pre-processing blocks (1115 and 1125 respectively) may rectify the images so that lens distortion is removed and so that epipolar lines are horizontal and correspond row-by-row in the left and right images. The depth-from-stereo block 1140 may compute the depth map from the left and right rectified images. The color image processing block 1150 may rectify the color image so that the lens distortion is removed and so that the image plane of the rectified color image is parallel to the image plane of the stereo depth map. The depth map warping block 1160 may warp the depth map so that it appears to have the same center of projection as the color camera, and may incorporate the functionality of any or all of FIGS. 2, 4, 6, 7, and 9 above. As will be discussed below, the processing of depth map warping block 1160 may be implemented in software, firmware, or hardware, or in any combination thereof. The processing of this block may use a custom or general purpose computing device.

Note that the above described methods and systems may be applied to align a depth map with another depth map, rather than with an image.

Moreover, the above discussion has presumed that the warped depth map is represented in a reference frame with the same X, Y, and Z axes as the original depth map. The above systems and methods may be used when the reference frame used to represent the result has a different basis. If R is used to denote the 3×3 matrix that maps the axes of the reference frame of the depth sensor into the axes of the reference frame of the camera, then 220 of FIG. 2 may be replaced by (x', y', z')=R·(x(i,j)−$T_x$, y(i,j)−$T_y$, z(i,j)−$T_z$).

In addition, in the case of a depth sensor that also produces an image (e.g., a stereo camera), such an image may be warped using the above warping and interpolation processes used to warp a depth map.

In an embodiment, some or all of the processing; described herein may be implemented as software, firmware, or hardware, or any combination thereof. Hardware embodiments may include discrete and integrated circuit logic, application specific integrated circuit (ASIC) logic, and microcontrollers, and may be implemented as part of a domain-specific integrated circuit package, or a combination of integrated circuit packages.

Figure 12:
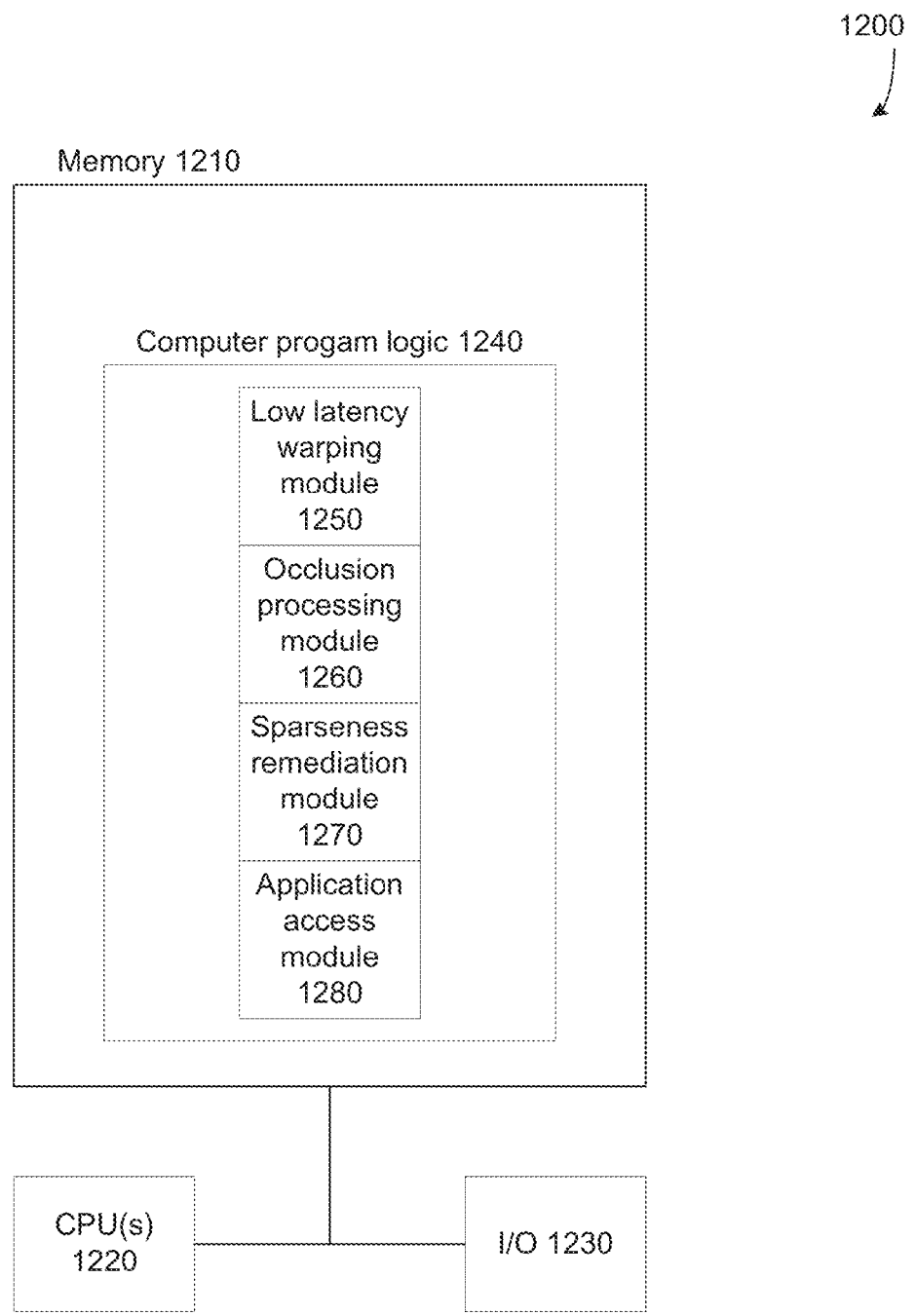
FIG. 12 is a block diagram illustrating a software or firmware embodiment of an embodiment.

A software or firmware embodiment is illustrated in the context of a computing system 1200 in FIG. 12. System 1200 may include one or more central processing unit(s) (CPU) 1220 and a body of memory 1210 that may include one or more transitory and/or non-transitory computer readable media that may store computer program logic 1240 and data generated during the processing described above, including but not limited to depth maps, for example. The body of memory 1210 may be implemented as one or more devices including a read-only memory (ROM) or random access memory (RAM) device, for example, or a combination thereof. CPU 1220 and memory 1210 may be in communication using any of several technologies known to one of ordinary skill in the art, such as a bus or a point-to-point interconnect. Computer program logic 1240 contained in memory 1210 may be read and executed by CPU 1220. In an embodiment, one or more I/O ports and/or I/O devices, shown collectively as I/O 1230, may also be connected to CPU 1220 and memory 1210. In an embodiment, I/O 1230 may include one or more input devices such as cameras 1110 and 1120 of FIG. 11 for example, or other devices for capturing an image and an original depth map.

Figure 6:
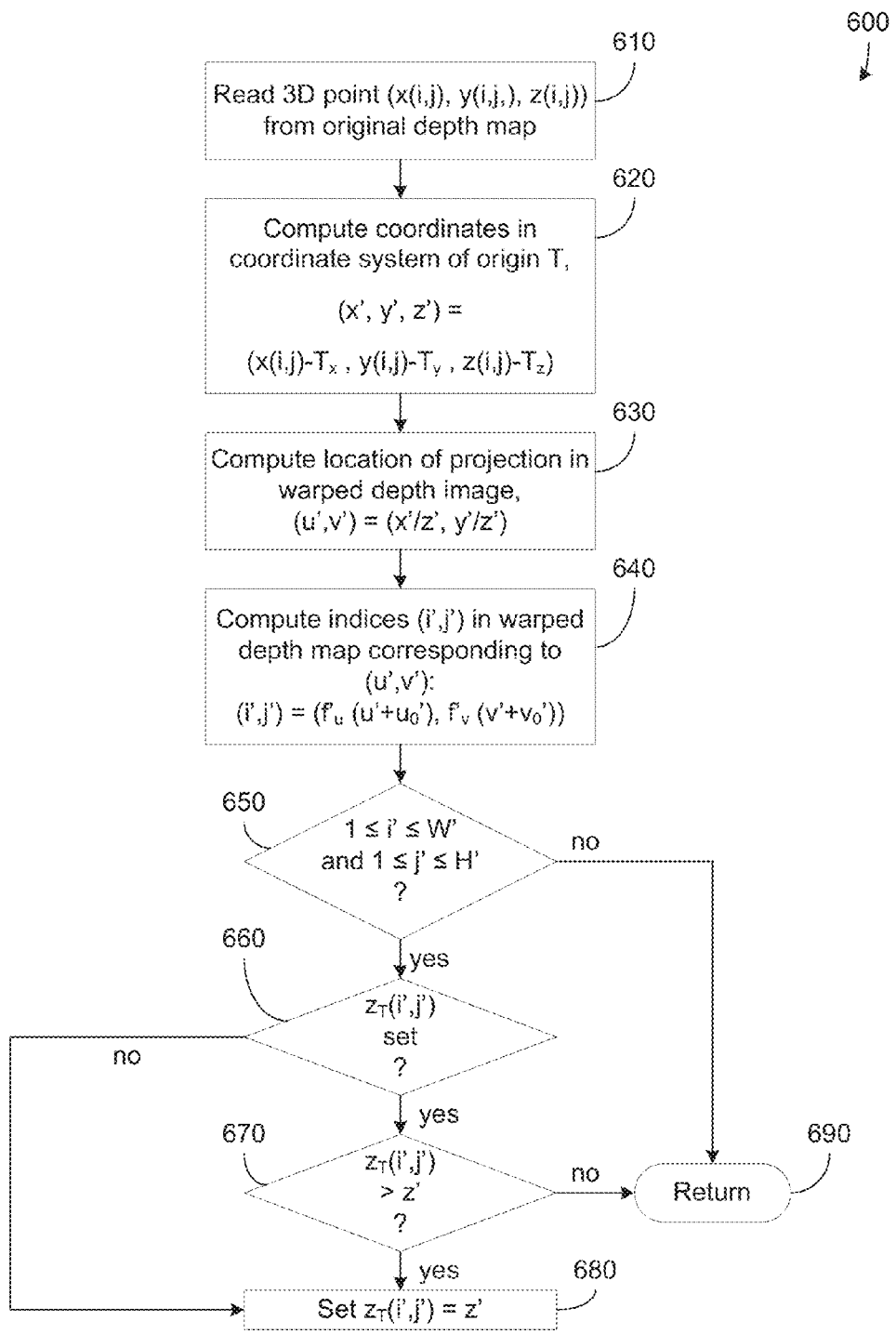
FIG. 6 is a flowchart illustrating a reduced-latency reduced depth map warping process that processes occlusion, according to an embodiment.
Figure 9:
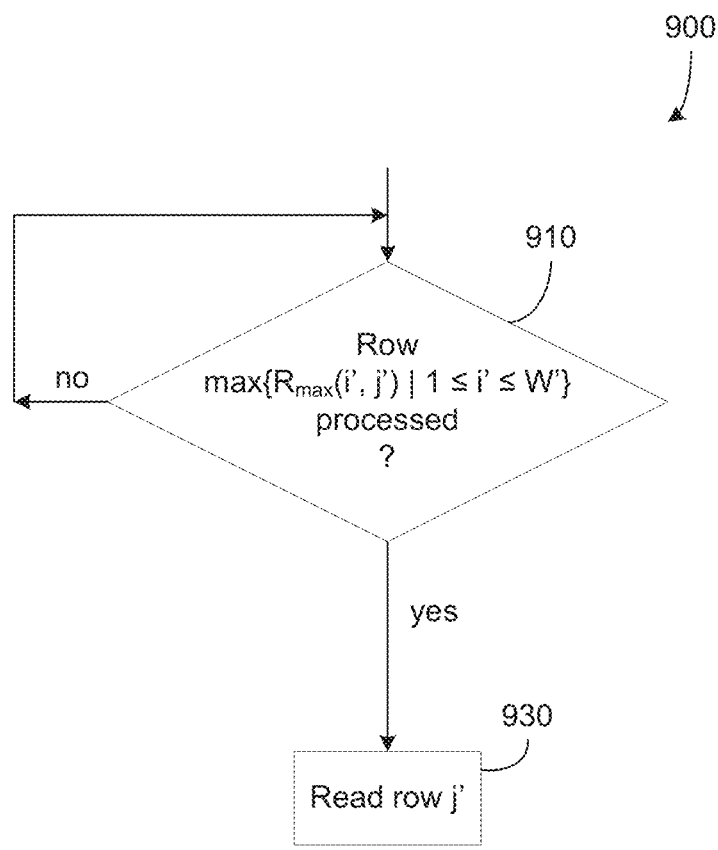
FIG. 9 is a flow chart illustrating when data in a warped depth map may be made available to an application, according to an embodiment.

In the embodiment of FIG. 12, computer program logic 1240 may include a module 1250 responsible for low latency warping of an original depth map to create a warped depth map. In an embodiment, module 1250 may incorporate the processing described above and illustrated in any or all of FIGS. 2, 4, 6, and/or 7. Computer program instructions, shown as logic 1240 may include a module 1260 configured to process occlusions in a warped depth map as shown in FIG. 6. Computer program logic 1240 may include a module 1270 for remediation of sparseness in a warped depth map, as shown in FIG. 7. Computer program logic 1240 may also include an application access module 1280 responsible for making data from a warped depth map accessible to another application, as shown in FIG. 9. Note that while occlusion processing module 1260, sparseness remediation module 1270, and application access module 1280 are shown as separate modules from warping module 1250, these may all be incorporated in a single module in an alternative embodiment.

Figure 13:
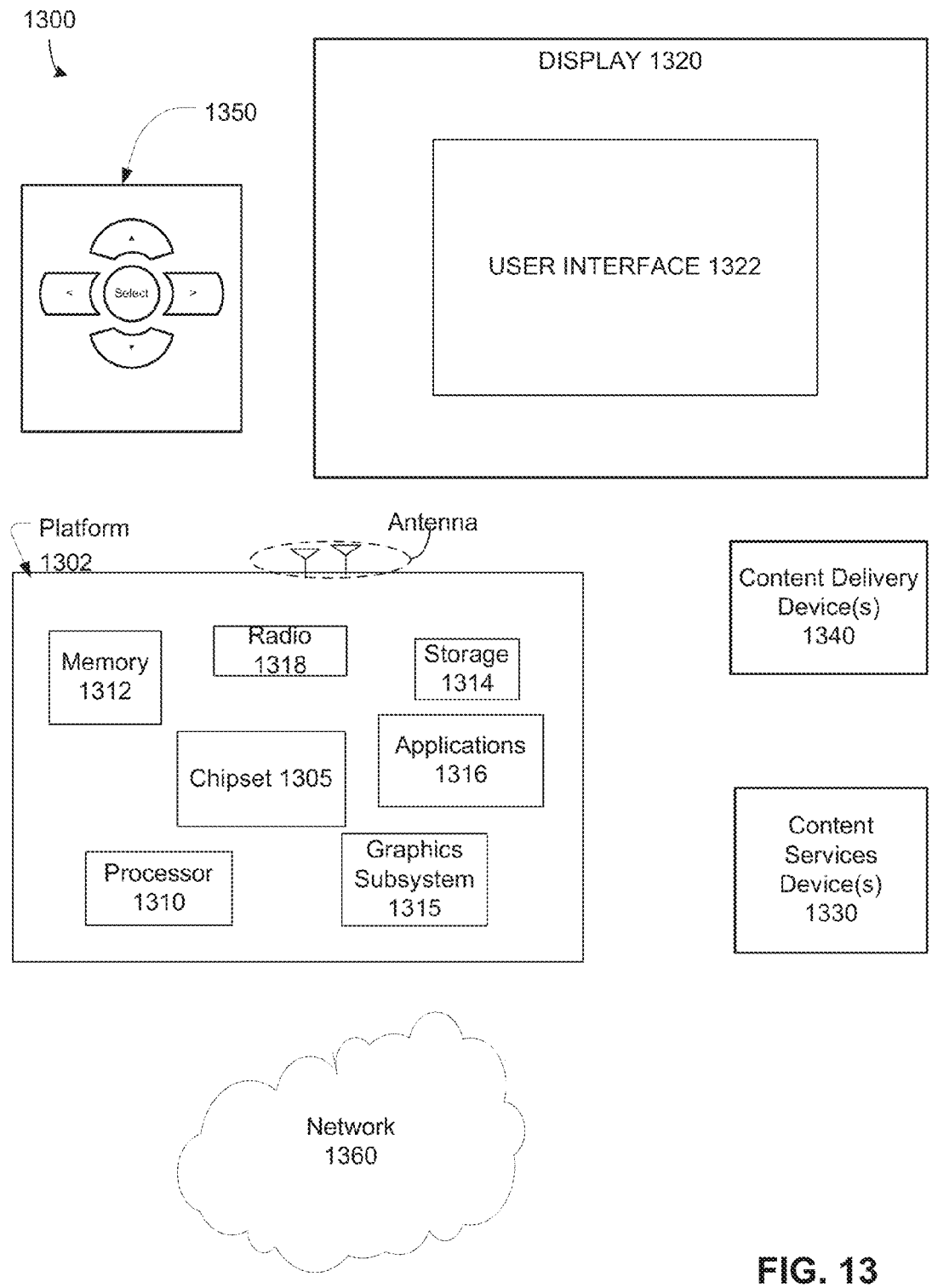
FIG. 13 illustrates an information system in which an embodiment may be implemented.

The systems, methods, and computer program products described above may be a part of a larger information system. FIG. 13 illustrates such an embodiment, as a system 1300. In embodiments, system 1300 may be a media system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart watch or smart television), mobile interact device (MID), messaging device, data communication device, and so forth. An image with an aligned warped depth map, generated as described above, may be provided to such a system for user access or for further processing by hardware or software executing in system 1300, for example.

In embodiments, system 1300 comprises a platform 1302 coupled to a display 1320. Platform 1302 may receive content from a content device such as content services device(s) 1330 or content delivery device(s) 1340 or other similar content sources. A navigation controller 1350 comprising one or more navigation features may be used to interact with, for example, platform 1302 and/or display 1320. Each of these components is described in more detail below.

In embodiments, platform 1302 may comprise any combination of a chipset 1305, processor 1310, memory 1312, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 1310 may comprise dual-core processor(s), dual-core mobile processor(s), and so forth.

Memory 1312 may be implemented as a volatile memory device such as, but not limited to a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1314 may comprise technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a. High-Definition Multimedia interface, DisplayPort, wireless HDMI, and/or wireless HD compliant techniques. Graphics subsystem 1315 could be integrated into processor 1310 or chipset 1305. Graphics subsystem 1315 could be a stand-alone card communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 1318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area networks (WMANs), cellular networks, and satellite networks. In communicating across such networks, radio 1318 may operate in accordance with one or more applicable standards in any version.

In embodiments, display 1320 may comprise any television type monitor or display configured to display images such as graphics processed by the processing units discussed above. Display 1320 may comprise, for example, a computer display screen, touch screen display, video monitor, television-like device, and/or a television. Display 1320 may be digital and/or analog. In embodiments, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In embodiments, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In embodiments, content services device(s) 1330 may comprise a cable television box, personal computer, network, telephone, Internet enabled devices or appliance capable of delivering digital information and/or content, and any other similar device capable of unidirectionally or bidirectionally communicating content between content providers and platform 1302 and/or display 1320, via network 1360 or directly. It will be appreciated that the content may be communicated unidirectionally and/or bidirectionally to and from any one of the components in system 1300 and a content provider via network 1360. Examples of content may include any media information including, for example, video, music, medical and gaming information, and so forth.

Content services device(s) 1330 receives content such as cable television programming including media information, digital information, and/or other content. Examples of content providers may include any cable of satellite television or radio or Internet content providers. The provided examples are not meant to limit embodiments of the invention.

In embodiments, platform 1302 may receive control signals from navigation controller 1350 having one or more navigation features. The navigation features of controller 1350 may be used to interact with user interface 1322, for example. In embodiments, navigation controller 1350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be echoed on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In embodiments, controller 1350 may not be a separate component but integrated into platform 1302 and/or display 1320. Embodiments, however, are not limited to the elements or in the context shown or described herein.

In embodiments, drivers (not shown) may comprise technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 when the platform is turned "off." In addition, chip set 1305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the invention.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
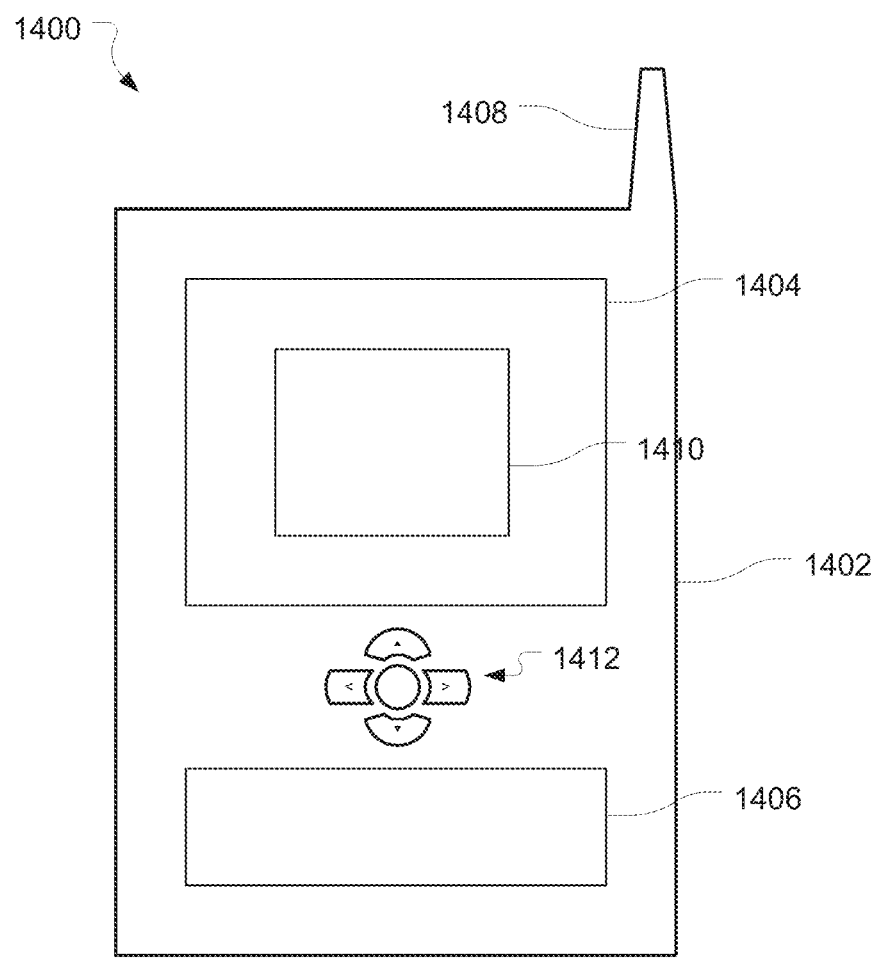
FIG. 14 illustrates a mobile information device in which an embodiment may be implemented.

As described above, system 1300 may be embodied in varying physical styles or form factors. FIG. 14 illustrates embodiments of a small form factor device 1400 in which system 1300 may be embodied. In embodiments, for example, device 1400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart watch or smart television), mobile internet device (MID), messaging device, data communication device, and so forth.

Examples of a mobile computing device also may include computers that are arranged to be worn by a person. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may comprise a housing 1402, a display 1404, an input/output (I/O) device 1406, and an antenna 1408. Device 1400 also may comprise navigation features 1412. Display 1404 may comprise any suitable display unit for displaying information 1410 appropriate for a mobile computing device. Displayed information may include graphics processed by processing units, e.g., GPUs. I/O device 1406 may comprise any suitable I/O device for entering information into a mobile computing device. Examples for I/O device 1406 may include an alphanumeric keyboard, a numeric keypad, a touch pad, input keys, buttons, switches, rocker switches, microphones, speakers, voice recognition device and software, and so forth. Information also may be entered into device 1400 by way of microphone. Such information may be digitized by a voice recognition device. The embodiments are not limited in this context.

The following examples pertain to further embodiments.

Example 1 is a system for image processing, comprising a first circuit logic unit configured to read pixel coordinates from an original depth map, and a second circuit logic unit configured to compute a warped depth map on the basis of the original depth map, wherein the computing of the warped depth map is begun prior to completion of reading all of the pixels from the original depth map.

In example 2, the computation of the warped depth map of example 1 may optionally comprise determining a bounded region in the original depth map, wherein the bounded region contains pixels whose coordinates affect the values of a pixel in the warped depth map.

In example 3, if the computing of the warped depth map of example 1 results in a plurality of pixels at the same coordinates, then the computing may optionally include choosing the pixel in the plurality of pixels having the smallest depth for use in the warped depth map.

In example 4, the computing of the warped depth map of example 1 may optionally comprise filling a missing value in the warped depth map by interpolation using depth values of pixels in a neighborhood of the warped depth map surrounding the location of the missing value.

In example 5, the interpolation of example 4 may optionally comprise assigning, to the missing value, the depth value that is one of: equal to a depth value of a neighboring pixel, and equal to a function of depth values of a plurality of respective neighboring pixels.

In example 6, the computing of the warped depth map of example 4 may optionally comprise, for a pixel (i, j) in the original depth map, computing and storing a location in the warped image $(a'(i,j), b'(i,j)) = (f'_u(u'+u'_0), f'_v(v'+v'_0))$, where $f'_u$ and $f'_v$ are focal distances and $(u'_0, v'_0)$ are coordinates of a principal point in the original depth map, $(a'(i, j), b'(i, j))$ corresponding to a point $(u', v')=(x'/z', y'/z')$ in the warped depth map; and if i>F and j>G, where F and G are dimensions of an interpolation neighborhood, then for each location (i', j') in the warped depth map of a missing value that can be interpolated from values at pixel locations in the warped depth map $(a'(i-c, j-d), b'(i-c, j-d))$ for all c between 0 and F and all d between 0 and G, computing an interpolated value $(x_T(i,j), y_T(i,j), z_T(i,j))$ using depth values at pixel locations in the warped depth map $(a'(i-c, j-d), b'(i-c, j-d))$ for all c between 0 and F and all d between 0 and G.

In example 7, the interpolation of example 6 may optionally comprise one of:

nearest neighbor interpolation; bi-linear interpolation; and bi-cubic interpolation.

In example 8, the subject matter of example 1 may optionally further comprise a third circuit logic unit configured to make the pixel coordinates, generated during computation of the warped depth map, available to an application prior to completion of the computing of the warped depth map.

In example 9, the making the generated pixel coordinates available to an application of example 8 may optionally comprise making a row j' of the warped depth map available when the row max $\{R_{max}(i',j')|1 \le i' \le W'\}$ in the original depth map has been completely processed during computation of the warped depth map, wherein $R_{max}$ is the highest row in a bounding region of the original depth map, where the bounding region includes pixels that affect the final value of pixel (i',j') in the warped depth map, creating a lookup table having an entry for each row of the original depth map, wherein each entry of the table identifies a row of the warped depth map that will be ready at the completion of computation of the row of the original depth map corresponding to the entry, and using the table to look up whether one or more rows of the warped depth map are ready.

Example 10 is a method of image processing, comprising reading pixel coordinates from an original depth map; and computing a warped depth map on the basis of the original depth map, wherein the computing of the warped depth map is begun prior to completion of reading all of the pixels from the original depth map, wherein said reading and computing are performed by a programmable processor.

In example 11, the computation of the warped depth map of claim 10 may optionally comprise determining abounded region in the original depth map, wherein the bounded region contains pixels whose coordinates affect the values of a pixel in the warped depth map.

In example 12, the subject matter of example 10 may optionally further comprise choosing the pixel in the plurality of pixels having the smallest depth for use in the warped depth map, if the computing of the warped depth map results in a plurality of pixels at the same coordinates.

In example 13, the computing of the warped depth map of example 10 may optionally comprise filling a missing value in the warped depth map by interpolation using depth values of pixels in a neighborhood of the warped depth map surrounding the location of the missing value.

In example 14, the interpolation of example 13 may optionally comprise assigning, to the missing value, the depth value that is one of: equal to a depth value of a neighboring pixel; and equal to a function of depth values of a plurality of respective neighboring pixels.

In example 15, the computing of the warped depth map of example 13 may optionally comprise, for a pixel (i, j) in the original depth map, computing and storing a location in the warped image $(a'(i, j), b'(i, j))=(f'_u(u'+u'_0), f'_v(v'+V_0))$, where $f'_u$ and $f'_v$ are focal distances and $(u'_0, v'_0)$ are coordinates of a principal point in the original depth map, $(a'(i, j), b'(i, j))$ corresponding to a point $(u', v')=(x'/z', y'/z')$ in the warped depth map; and if i>F and j>G, where F and G are dimensions of an interpolation neighborhood, then for each location (i', j') in the warped depth map of a missing value that can be interpolated from values at pixel locations in the warped depth map (a'(i-c, j-d), b'(i-c, j-d)) for all c between 0 and F and all d between 0 and G, computing an interpolated value $(x_T(i,j), y_T(i,j), z_T(i,j))$ using depth values at pixel locations in the warped depth map (a'(i-c, j-d), b'(i-c, j-d)) for all c between 0 and F and all d between 0 and G.

In example 16 the interpolation of example 15 may optionally comprise one of nearest neighbor interpolation; bi-linear interpolation; and bi-cubic interpolation.

In example 17, the subject matter of example 10 may optionally further comprise making the pixel coordinates, generated during computation of the warped depth map, available to an application prior to completion of the computing of the warped depth map.

In example 18, the making of the generated pixel coordinates available to an application of example 17 may optionally comprise making a row j' of the warped depth map available when the row max $\{R_{max}(i',j')|1\leq i'\leq W'\}$ in the original depth map has been completely processed during computation of the warped depth map, wherein $R_{max}$ is the highest row in a bounding region of the original depth map, where the bounding region includes pixels that affect the final value of pixel (i',j') in the warped depth map, creating a lookup table having an entry for each row of the original depth map, wherein each entry of the table identifies a row of the warped depth map that will be ready at the completion of computation of the row of the original depth map corresponding to the entry, and using the table to look up whether one or more rows of the warped depth map are ready.

Example 19 is a computer program product for image processing, including at least one non-transitory computer readable medium having computer program logic stored therein, the computer program logic including logic to cause a processor to read pixel coordinates from an original depth map; and logic to cause the processor to compute a warped depth map on the basis of the original depth map, wherein the computing of the warped depth map is begun prior to completion of reading all of the pixels from the original depth map.

In example 20, the computation of the warped depth map of example 19 may optionally comprise determining a bounded region in the original depth map, wherein the bounded region contains pixels whose coordinates affect the values of a pixel in the warped depth map.

In example 21, if the computing of the warped depth map of example 19 results in a plurality of pixels at the same coordinates, then the computing may optionally include choosing the pixel in the plurality of pixels having the smallest depth for use in the warped depth map.

In example 22, the computing of the warped depth map of example 19 may optionally comprise filling a missing value in the warped depth map by interpolation using depth values of pixels in a neighborhood of the warped depth map surrounding the location of the missing value.

In example 23, the interpolation of example 22 may optionally comprise assigning, to the missing value, the depth value that is one of: equal to a depth value of a neighboring pixel; and equal to a function of depth values of a plurality of respective neighboring pixels.

In example 24, the computing of the warped depth map of example 22 may optionally comprise: for a pixel (i, j) in the original depth map, computing and storing a location in the warped image $(a'(i, j), b'(i, j))=(f'_u(u'+u'_0), f'_v(v'+v'_0))$, where $f'_u$ and $f'_v$ are focal distances and $(u'_0, v'_0)$ are coordinates of a principal point in the original depth map, $(a'(i, j), b'(i, j))$ corresponding to a point $(u', v')=(x'/z', y'/z')$ in the warped depth map; and if i>F and j>G, where F and G are dimensions of an interpolation neighborhood, then for each location (i', j') in the warped depth map of a missing value that can be interpolated from values at pixel locations in the warped depth map (a'(i-c, j-d), b'(i-c, j-d)) for all c between 0 and F and all d between 0 and G, computing an interpolated value $(x_T(i,j), y_T(i,j), z_T(i,j))$ using depth values at pixel locations in the warped depth map (a'(i-c, j-d), b'(i-c, j-d)) for all c between 0 and F and all d between 0 and G.

In example 25, the interpolation of example 24 may optionally comprise one of nearest neighbor interpolation; bi-linear interpolation; and bi-cubic interpolation.

In example 26, the subject matter of example 19 may optionally further comprise logic to cause the processor to make the pixel coordinates, generated during computation of the warped depth map, available to an application prior to completion of the computing of the warped depth map.

In example 27, the making of the generated pixel coordinates available to an application of example 26 may optionally comprise making a row j' of the warped depth map available when the row max $\{R_{max}(i',j')|1\leq i'\leq W'\}$ in the original depth map has been completely processed during computation of the warped depth map, wherein $R_{max}$ is the highest row in a bounding region of the original depth map, where the bounding region includes pixels that affect the final value of pixel in the warped depth map, creating a lookup table having an entry for each row of the original depth map, wherein each entry of the table identifies a row of the warped depth map that will be ready at the completion of computation of the row of the original depth map corresponding to the entry, and using the table to look up whether one or more rows of the warped depth map are ready.

Example 28 is an apparatus for image processing, comprising means for reading pixel coordinates from an original depth map; and means for computing a warped depth map on the basis of the original depth map, wherein the computing of the warped depth map is begun prior to completion of reading all of the pixels from the original depth map.

In example 29, the means for computation of the warped depth map of example 28 may optionally comprise means for determining a bounded region in the original depth map, wherein the bounded region contains pixels whose coordinates affect the value of a pixel in the warped depth map.

In example 30, the subject matter of example 28 may optionally further comprise choosing the pixel in the plurality of pixels having the smallest depth for use in the warped depth map, if the computing of the warped depth map results in a plurality of pixels at the same coordinates.

In example 31, the means for computing of the warped depth map of example 28 may optionally comprise means for filling a missing value in the warped depth map by interpolation using depth values of pixels in a neighborhood of the warped depth map surrounding the location of the missing value.

In example 32, the interpolation of example 31 may optionally comprise assigning, to the missing value, the depth value that is one of: equal to a depth value of a neighboring pixel; and equal to a function of depth values of a plurality of respective neighboring pixels.

In example 33, the means for computing of the warped depth map of example 31 may optionally further comprise means, for a pixel (i, j) in the original depth map, for computing and storing a location in the warped image (a'(i, j), b'(i,j))=($f_u(u+u_0)$, $f_v(v+v_0)$), where $f_u$ and $f_v$ are focal distances and ($u_0$, $v_0$) are coordinates of a principal point in the original depth map, (a'(i, j), b'(i,j)) corresponding to a point (u', v')=(x'/z', v'/z') in the warped depth map; and means, if i>F and j>G, where F and G are dimensions of an interpolation neighborhood, then for each location (i', j') in the warped depth map of a missing value that can be interpolated from values at pixel locations in the warped depth map (a'(i-c, j-d), b'(i-c, j-d)) for all c between 0 and F and all d between 0 and G, for computing an interpolated value ($x_T(i,j)$, $y_T(i,j)$, $z_T(i,j)$) using depth values at pixel locations in the warped depth map (a'(i-c, j-d), b'(i-c, j-d)) for all c between 0 and F and all d between 0 and G.

In example 34, the interpolation of example 33 may optionally comprise one of: nearest neighbor interpolation; bi-linear interpolation; and bi-cubic interpolation.

In example 35, the subject matter of example 28 may optionally further comprise means for making the pixel coordinates, generated during computation of the warped depth map, available to an application prior to completion of the computing of the warped depth map.

In example 36, the means of example 35 for making the generated pixel coordinates available to an application may optionally comprise means for making a row j' of the warped depth map available when the row max $\{R_{max}(i',j')|1 \leq i' \leq W'\}$ in the original depth map has been completely processed during computation of the warped depth map, wherein is the highest row in a bounding region of the original depth map, where the bounding region includes pixels that affect the final value of pixel (i',j') in the warped depth map, means for creating a lookup table having an entry for each row of the original depth map, wherein each entry of the table identifies a row of the warped depth map that will be ready at the completion of computation of the row of the original depth map corresponding to the entry, and means for using the table to look up whether one or more rows of the warped depth map are ready.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed. Moreover, while various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A system for image processing, comprising:
a first circuit logic unit configured to read pixel coordinates from an original depth map; and
a second circuit logic unit configured to compute a warped depth map on the basis of the original depth map, wherein the computing of the warped depth map is begun prior to completion of reading all of the pixels from the original depth map, wherein if the computing of the warped depth map results in a plurality of pixels at the same coordinates, then choosing the pixel in the plurality of pixels having the smallest depth for use in the warped depth map.

2. The system of claim 1, wherein the computation of the warped depth map comprises:
determining a bounded region in the original depth map, wherein the bounded region contains pixels whose coordinates affect the value of a pixel in the warped depth map.

3. The system of claim 1, wherein the computing of the warped depth map comprises:
filling a missing value in the warped depth map by interpolation using depth values of pixels in a neighborhood of the warped depth map surrounding the location of the missing value.

4. The system of claim 3, wherein the interpolation comprises assigning, to the missing value, the depth value that is one of:
equal to a depth value of a neighboring pixel; and
equal to a function of depth values of a plurality of respective neighboring pixels.

5. The system of claim 3, wherein the computing of the warped depth map comprises:
for a pixel (i, j) in the original depth map, computing and storing a location in the warped image
(a'(i, j), b'(i, j))=($f_u(u+u_0)$, $f_v(v+v_0)$), where $f_u$ and $f_v$ are focal distances and ($u_0$, $v_0$) are coordinates of a principal point in the original depth map, (a'(i, j), b'(i, j)) corresponding to a point (u', v')=(x'/z', y'/z') in the warped depth map; and
if i>F and j>G, where F and G are dimensions of an interpolation neighborhood, then for each location (i', j') in the warped depth map of a missing value that can be interpolated from values at pixel locations in the warped depth map (a'(i-c, j-d), b'(i-c, j-d)) for all c between 0 and F and all d between 0 and G, computing an interpolated value ($x_T(i',j')$, $y_T(i',j')$, $z_T(i',j')$) using depth values at pixel locations in the warped depth map (a'(i-c, j-d), b'(i-c, j-d)) for all c between 0 and F and all d between 0 and G.

6. The system of claim 5, wherein the interpolation comprises one of:
nearest neighbor interpolation;
bi-linear interpolation; and
bi-cubic interpolation.

7. The system of claim 1, further comprising:
a third circuit logic unit configured to make the pixel values, generated during computation of the warped depth map, available to an application prior to completion of the computing of the warped depth map.

8. The system of claim 7, wherein making the generated pixel values available to an application comprises:
making a row j' of the warped depth map available when the row $$\max\{R_{max}(i',j')|1 \leq i' \leq W'\}$$

in the original depth map has been completely processed during computation of the warped depth map, wherein $R_{max}$ is the highest row in a bounding region of the original depth map, where the bounding region includes pixels that affect the final value of pixel (i',j') in the warped depth map;
creating a lookup table having an entry for each row of the original depth map, wherein each entry of the table identifies a row of the warped depth map that will be ready at the completion of computation of the original depth map row corresponding to the entry; and
using the table to look up whether one or more rows of the warped depth map are ready.

9. A method of image processing, comprising:
reading pixel coordinates from an original depth map; and
computing a warped depth map on the basis of the original depth map, wherein the computing of the warped depth map is begun prior to completion of reading all of the pixels from the original depth map; and
if the computing of the warped depth map results in a plurality of pixels at the same coordinates, choosing the pixel in the plurality of pixels having the smallest depth for use in the warped depth map,
wherein said reading and computing are performed by a programmable processor.

10. The method of claim 9, wherein the computation of the warped depth map comprises:
determining a bounded region in the original depth map, wherein the bounded region contains pixels whose coordinates affect the value of a pixel in the warped depth map.

11. The method of claim 9, wherein the computing of the warped depth map comprises:
filling a missing value in the warped depth map by interpolation using depth values of pixels in a neighborhood of the warped depth map surrounding the location of the missing value.

12. The method of claim 11, wherein the interpolation comprises assigning, to the missing value, the depth value that is one of:
equal to a depth value of a neighboring pixel; and
equal to a function of depth values of a plurality of respective neighboring pixels.

13. The method of claim 11, wherein the computing of the warped depth map comprises:
for a pixel (i, j) in the original depth map, computing and storing a location in the warped image
(a'(i, j), b'(i, j))=($f_u$(u+$u_0$), $f_v$(v+$v_0$)), where $f_u$ and $f_v$ are focal distances and ($u_0$, $v_0$) are coordinates of a principal point in the original depth map, (a'(i, j), b'(i, j)), corresponding to a point (u', v')=(x'/z', y'/z') in the warped depth map; and
if i>F and j>G, where F and G are dimensions of an interpolation neighborhood, then for each location (i', j') in the warped depth map of a missing value that can be interpolated from values at pixel locations in the warped depth map (a'(i-c, j-d), b'(i-c, j-d)) for all c between 0 and F and all d between 0 and G, computing an interpolated value ($x_T$(i,j), $y_T$(i,j), $z_T$(i,j)) using depth values at pixel locations in the warped depth map (a'(i-c, j-d), b'(i-c, j-d)) for all c between 0 and F and all d between 0 and G.

14. The method of claim 13, wherein the interpolation comprises one of:
nearest neighbor interpolation;
bi-linear interpolation; and
bi-cubic interpolation.

15. The method of claim 9, further comprising:
making the pixel coordinates generated during computation of the warped depth map, available to an application prior to completion of the computing of the warped depth map.

16. The method of claim 15, wherein making the generated pixel coordinates available to an application comprises:
making a row j' of the warped depth map available when the row $$\max\{R_{max}(i',j')|1\leq i'\leq W'\}$$

in the original depth map has been completely processed during computation of the warped depth map, wherein $R_{max}$ is the highest row in a bounding region of the original depth map, where the bounding region includes pixels that affect the final value of pixel (i',j') in the warped depth map;
creating a lookup table having an entry for each row of the original depth map, wherein each entry of the table identifies a row of the warped depth map that will be ready at the completion of computation of the row of the original depth map corresponding to the entry; and
using the table to look up whether one or more ready rows of the warped depth map are ready.

17. A computer program product for image processing, including at least one non-transitory computer readable medium having computer program logic stored therein, the computer program logic including:
logic to cause a processor to read pixel coordinates from an original depth map; and
logic to cause the processor to compute a warped depth map on the basis of the original depth map, wherein the computing of the warped depth map is begun prior to completion of reading all of the pixels from the original depth map, wherein if the computing of the warped depth map results in a plurality of pixels at the same coordinates, then choosing the pixel in the plurality of pixels having the smallest depth for use in the warped depth map.

18. The computer program product of claim 17, wherein the computation of the warped depth map comprises:
determining a bounded region in the original depth map, wherein the bounded region contains pixels whose coordinates affect the values of a pixel in the warped depth map.

19. The computer program product of claim 17, wherein the computing of the warped depth map comprises:
filling a missing value in the warped depth map by interpolation using depth values of pixels in a neighborhood of the warped depth map surrounding the location of the missing value.

20. The computer program product of claim 19, wherein the interpolation comprises assigning, to the missing value, the depth value that is one of:
equal to a depth value of a neighboring pixel; and
equal to a function of depth values of a plurality of respective neighboring pixels.

21. The computer program product of claim 19, wherein the computing of the warped depth map comprises:
for a pixel (i, j) in the original depth map, computing and storing a location in the warped image
(a'(i, j), b'(i, j))=($f_u$(u+$u_0$), $f_v$(v+$v_0$)), where $f_u$ and $f_v$ are focal distances and ($u_0$, $v_0$) are coordinates of a principal point in the original depth map, (a'(i, j), b'(i, j)) corresponding to a point (u', v')=(x'/z', y'/z') in the warped depth map; and
if i>F and j>G, where F and G are dimensions of an interpolation neighborhood, then for each location (i', j') in the warped depth map of a missing value that can be interpolated from values at pixel locations in the warped depth map (a'(i-c, j-d), b'(i-c, j-d)) for all c between 0 and F and all d between 0 and G, computing an interpolated value ($x_T(i,j)$, $y_T(i,j)$, $z_T(i,j)$) using depth values at pixel locations in the warped depth map (a'(i-c, j-d), b'(i-c, j-d)) for all c between 0 and F and all d between 0 and G.

22. The computer program product of claim 21, wherein the interpolation comprises one of:
nearest neighbor interpolation;
bi-linear interpolation; and
bi-cubic interpolation.

23. The computer program product of claim 17, further comprising:
logic to cause the processor to make the pixel coordinates, generated during computation of the warped depth map, available to an application prior to completion of the computing of the warped depth map.

24. The computer program product of claim 23, wherein making the generated pixel coordinates available to an application comprises:

making a row j' of the warped depth map available when the row $$\max\{R_{max}(i',j') | 1 \le i' \le W'\}$$

in the original depth map has been completely processed during computation of the warped depth map, wherein $R_{max}$ is the highest row in a bounding region of the original depth map, where the bounding region includes pixels that affect the final value of pixel (i',j') in the warped depth map;

creating a lookup table having an entry for each row of the original depth map, wherein each entry of the table identifies a row of the warped depth map that will be ready at the completion of computation of the row of the original depth map corresponding to the entry; and using the table to look up whether one or more ready rows of the warped depth map are ready.

* * * * *